United States Patent
Kobayashi et al.

(10) Patent No.: US 10,021,707 B2
(45) Date of Patent: Jul. 10, 2018

(54) CONTROL DEVICE, CONTROL METHOD, AND BASE STATION

(71) Applicant: FUJITSU LIMITED, Kawasaki-shi, Kanagawa (JP)

(72) Inventors: Takaharu Kobayashi, Yamato (JP); Teppei Oyama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 331 days.

(21) Appl. No.: 15/045,796

(22) Filed: Feb. 17, 2016

(65) Prior Publication Data

US 2016/0249363 A1 Aug. 25, 2016

(30) Foreign Application Priority Data

Feb. 20, 2015 (JP) ................. 2015-031953

(51) Int. Cl.
*H04W 72/08* (2009.01)
*H04B 7/02* (2018.01)
(Continued)

(52) U.S. Cl.
CPC ............. *H04W 72/085* (2013.01); *H04B 7/02* (2013.01); *H04W 28/16* (2013.01); *H04W 72/0433* (2013.01)

(58) Field of Classification Search
None
See application file for complete search history.

(56) References Cited

U.S. PATENT DOCUMENTS

| 2010/0034151 | A1* | 2/2010 | Alexiou ................ H04B 7/022 370/329 |
| 2011/0134848 | A1 | 6/2011 | Tamaki |

(Continued)

FOREIGN PATENT DOCUMENTS

| JP | 2010-246114 A | 10/2010 |
| JP | 2011-142375 A | 7/2011 |

(Continued)

OTHER PUBLICATIONS

Atsushi Nagate et al., "[Tutorial Lecture] Basic Field Experiment of Multi-BS Cooperative Transmission Control," IEICE Technical Report, RCS2011-170, SR2011-74, AN2011-48, USN2011-50 (Oct. 2011), pp. 177-182. English abstract indicated on the front page of document.

(Continued)

*Primary Examiner* — Jeffrey M Rutkowski
*Assistant Examiner* — Andre Tacdiran
(74) *Attorney, Agent, or Firm* — Arent Fox LLP

(57) ABSTRACT

A control device including: a processor configured to: receive first and second quality information indicating qualities of wireless signals transmitted from a first and a second base stations, determine a first and a second ratios based on the first and the second quality information, the first ratio being a ratio with which the base stations perform a coordinated transmission, the second ratio being a ratio with which the first base station performs an uncoordinated transmission, and determine a coordination pattern based on the ratios, the coordination pattern indicating a first wireless resource and a second wireless resource in a specified wireless resource, the first and the second wireless resources being allocated to the coordinated transmission and the uncoordinated transmission, the coordination pattern being applied to a specified period including a plurality of units of period each being a unit of period for wireless transmission in a wireless communication system.

15 Claims, 20 Drawing Sheets

(51) Int. Cl.
*H04W 28/16* (2009.01)
*H04W 72/04* (2009.01)

(56) References Cited

U.S. PATENT DOCUMENTS

| | | | |
|---|---|---|---|
| 2011/0237272 A1* | 9/2011 | Gorokhov | H04B 7/024 455/452.1 |
| 2012/0087265 A1* | 4/2012 | Tamaki | H01Q 1/246 370/252 |
| 2012/0184322 A1* | 7/2012 | Falconetti | H04W 28/18 455/524 |
| 2014/0241201 A1* | 8/2014 | Kim | H04J 11/0053 370/252 |
| 2014/0348096 A1* | 11/2014 | Nagata | H04W 72/1247 370/329 |
| 2015/0110025 A1* | 4/2015 | Chae | H04B 7/024 370/329 |
| 2016/0249363 A1* | 8/2016 | Kobayashi | H04W 72/085 |
| 2016/0315726 A1* | 10/2016 | Sandberg | H04W 72/121 |

FOREIGN PATENT DOCUMENTS

| | | |
|---|---|---|
| JP | 2014127961 A * | 12/2012 |
| JP | 2013-093879 A | 5/2013 |
| JP | 2014-017800 A | 1/2014 |

OTHER PUBLICATIONS

Daigo Ogata et al., "A Study on Multi-BS Cooperative Transmission Control in the Cellular Mobile Communication," IEICE Technical Report, RCS2011-16(2011-4), pp. 89-94. English Abstract indicated on the front page of document.

* cited by examiner

FIG. 9

| CLUSTER SIZE | ABSENCE OF COORDINATION | EXISTENCE OF COORDINATION | EXISTENCE OF COORDINATION (SECOND EXAMPLE) |
|---|---|---|---|
| 2 [Cells] | 2N | 4N | 2N |
| 3 [Cells] | 3N | 12N | 3N |
| 4 [Cells] | 4N | 32N | 4N |
| 5 [Cells] | 5N | 80N | 5N |
| 6 [Cells] | 6N | 192N | 6N |
| 7 [Cells] | 7N | 448N | 7N |

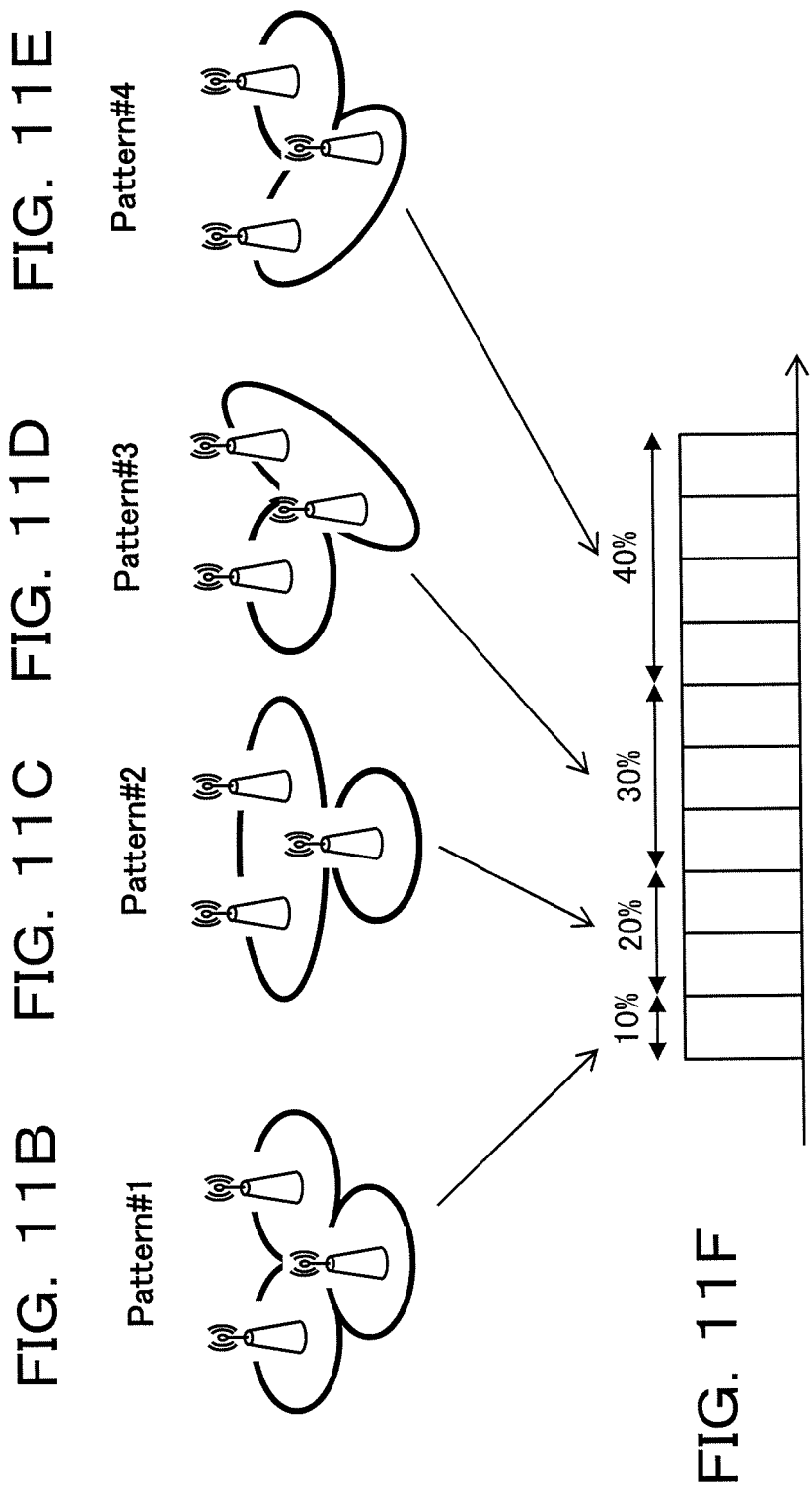

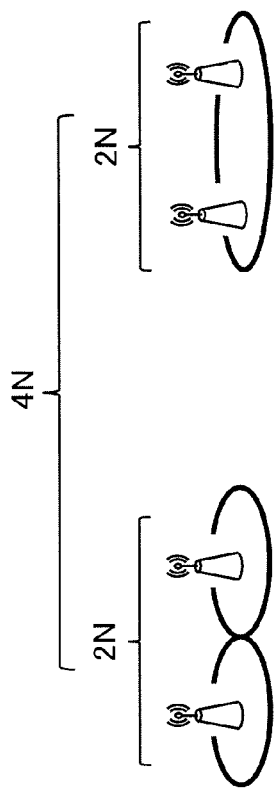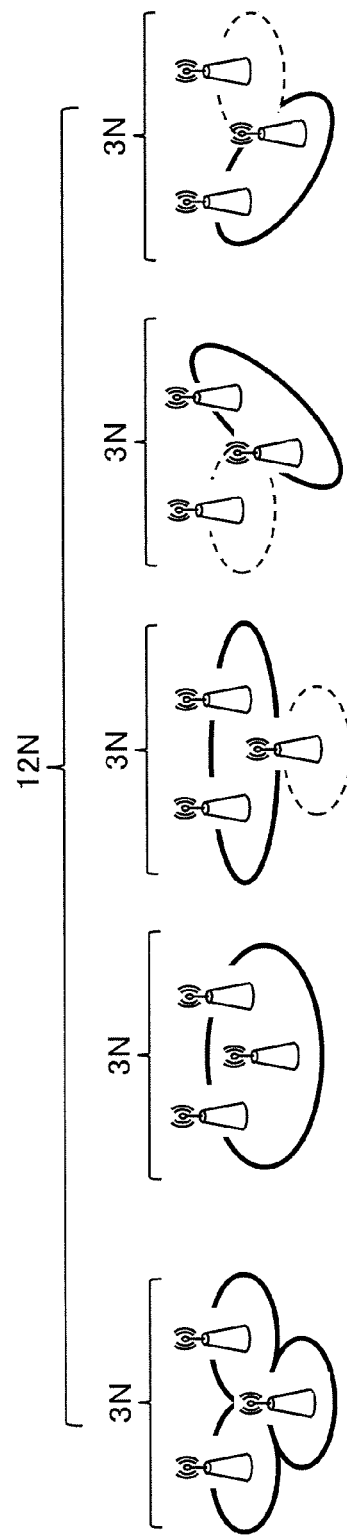

CONTROL DEVICE, CONTROL METHOD, AND BASE STATION

CROSS-REFERENCE TO RELATED APPLICATION

This application is based upon and claims the benefit of priority of the prior Japanese Patent Application No. 2015-031953, filed on Feb. 20, 2015, the entire contents of which are incorporated herein by reference.

FIELD

The embodiments discussed herein are related to a control device, a control method, and a base station.

BACKGROUND

Currently, wireless communication systems such as a mobile phone system and a wireless local area network (LAN) are widely used. In addition, in the field of wireless communication, in order to further improve a communication speed and a communication capacity, a next-generation communication technology is continuously discussed. In, for example, 3rd Generation Partnership Project (3GPP) serving as a standardization body, standardization of a communication standard called Long Term Evolution (LTE) and standardization of a communication standard called LTE-Advanced (LTE-A) based on LTE are completed or studied.

As one of such technologies regarding wireless communication, there is coordinated multi-point transmission and reception (hereinafter, called "coordinated communication" or "COMP" in some cases). The coordinated communication is, for example, a technology in which base stations perform, in a coordinated manner, wireless communication with one mobile station. Compared with a case of performing no coordinated communication, by performing coordinated communication with a mobile station located in an area in which the cell range (or a "service provision range") of a base station and the cell range of another base station overlap with each other, it is possible to achieve the improvement of a throughput in the relevant mobile station and to achieve the enhancement of communication performance.

As technologies regarding such coordinated communication, there are, for example, the following technologies. In other words, for all users, a coordination scheduler calculates all proportional fairness (PF) metrics of coordination stop patterns. In addition, the coordination scheduler calculates, for each of sectors, a user whose PF metric is maximized in each of coordination patterns, and the coordination scheduler selects a coordination pattern in which the sum of the PF metrics of the relevant user is maximized. Note that the PF metric is, for example, a ratio of an instantaneous throughput to an average throughput.

In addition, there is a technology for defining inter-base station coordinated communication as effective if a throughput in a case of performing coordinated communication is higher than the total value of throughputs for respective base stations in a case of not performing the coordinated communication.

Furthermore, there is a technology for setting the allocation frequency of resources of a user terminal that performs a multi-site connection to 1/(the number of cooperative base stations of the multi-site connection) with respect to the allocation frequency of resources of a user terminal that performs a single-site connection.

According to this technology, it is thought that it is possible to enhance the throughput of a user terminal located in a cell boundary and to suppress the reduction of a total throughput of a cellular mobile communication system.

Furthermore, there is a technology for switching, based on a communication speed requested by a terminal, between communication modes (for example, a mode in which only one base station and one terminal perform communication and a mode in which simultaneous communication with terminals is performed while a base station control station causes base station to cooperate with one another).

According to this technology, it is thought that it is possible to reduce a feedback amount while satisfying the communication speed requested by the terminal.

Furthermore, there is a technology in which the sum or product of actual measured values of throughputs of respective base station devices is compared with a default value in a centralized control station and based on the comparison result thereof, a communication parameter such as the number of terminals subordinated to a base station device is determined.

According to this technology, it is thought that it is possible to enhance the efficiency of wireless communication in a wireless communication system in which an interference source exists in the neighborhood thereof, thereby generating an interference signal.

Furthermore, there is a technology in which if the aggregate throughput of a coordinated transmission group in a case of adding a selection target cell and a selection target user is higher than the sum of the throughputs of the coordinated transmission group and the selection target cell in a case of not adding the selection target cell, the relevant cell and the relevant user are added to the coordinated transmission group.

According to this technology, it is thought that it is possible to dynamically determine a cell and a user, which are to be added to the coordinated transmission, and to provide a multi-cell coordination method capable of maximizing the throughput of a super cell.

As nonpatent literatures, there are Ogata, Daigo, et al., "A Study on Multi-BS Cooperative Transmission Control in the Cellular Mobile Communication", *Technical report of IEICE. RCS*, RCS2011-16 (2011-4) and Nagate, Atsushi, et al., "[Tutorial Lecture] Basic Field Experiment of Multi-BS Cooperative Transmission Control", *Technical report of IEICE. RCS*, RCS2011-170, SR2011-74, AN2011-48, USN2011-50 (2011-10).

As patent literatures, there are Japanese Laid-open Patent Publication No. 2011-142375, Japanese Laid-open Patent Publication No. 2013-93879, Japanese Laid-open Patent Publication No. 2014-17800, and Japanese Laid-open Patent Publication No. 2010-246114.

SUMMARY

According to an aspect of the invention, a control device in a wireless communication system, the control device includes a memory, and a processor coupled to the memory and configured to: receive, from a first base station, first quality information indicating a quality of a wireless signal transmitted from the first base station, receive, from a second base station, second quality information indicating a quality of a wireless signal transmitted from the second base station, determine at least one of a first ratio and a second ratio based on the first quality information and the second quality information, the first ratio being a ratio with which the first base station and the second base station perform a coordinated transmission, the second ratio being a ratio with which the first base station performs an uncoordinated transmission without the second base station, and determine a coordination pattern based on at least one of the first ratio and the second ratio, the coordination pattern indicating a first wireless resource and a second wireless resource in a specified wireless resource, the first wireless resource being a wireless resource allocated to the coordinated transmission performed by the first base station and the second base station, the second wireless resource being a wireless resource allocated to the uncoordinated transmission by the first base station, a ratio of the first wireless resource to the specified wireless resource corresponding to the first ratio, a ratio of the second wireless resource to the specified wireless resource corresponding to the second ratio, the coordinated pattern being applied to a specified period including a plurality of units of period, each of the plurality of units of period being a unit of period for wireless transmission in the wireless communication system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a calculation amount;

FIG. 11B to FIG. 11E are diagrams each illustrating an example of a coordination pattern, and FIG. 11F is a diagram illustrating examples of allocation rates of wireless resources;

FIG. 16A to FIG. 16G are diagrams each illustrating an example of a calculation amount;

DESCRIPTION OF EMBODIMENTS

However, in the above-mentioned technology in which the coordination scheduler calculates the PF metrics and selects a coordination pattern, the coordination scheduler calculates the PF metrics of all users for each of all patterns including, for example, coordination stop patterns and coordination patterns in some cases. In this case, in the relevant technology, the number of coordination patterns increases with an increase in the number of base stations, and the calculation amount of the PF metrics significantly increases with an increase in the number of patterns.

As for the above-mentioned technology for comparing a throughput in a case of performing coordinated communication and a throughput in a case of not performing the coordinated communication with each other, the two throughputs are compared with each other, thereby judging whether or not the coordinated communication is effective, and how to suppress the calculation amount of the PF metrics is not discussed.

In addition, as for the above-mentioned technology for setting the allocation frequency of resources of a user terminal that performs multi-site connection and the above-mentioned technology for switching between communication modes, based on a communication speed requested by a terminal, to suppress the calculation amount of the PF metrics is not discussed.

Furthermore, as for the above-mentioned technology for determining a communication parameter or the above-mentioned technology for dynamically adding a cell and a user to the coordinated transmission group, to suppress the calculation amount of the PF metrics is not discussed, and it is difficult to solve such a problem.

Therefore, one disclosure is to provide a control device, a coordination pattern selection method, and a wireless communication system, which each suppress a calculation amount.

Hereinafter, embodiments for implementing the present technology will be described.

First Embodiment

Figure 1:
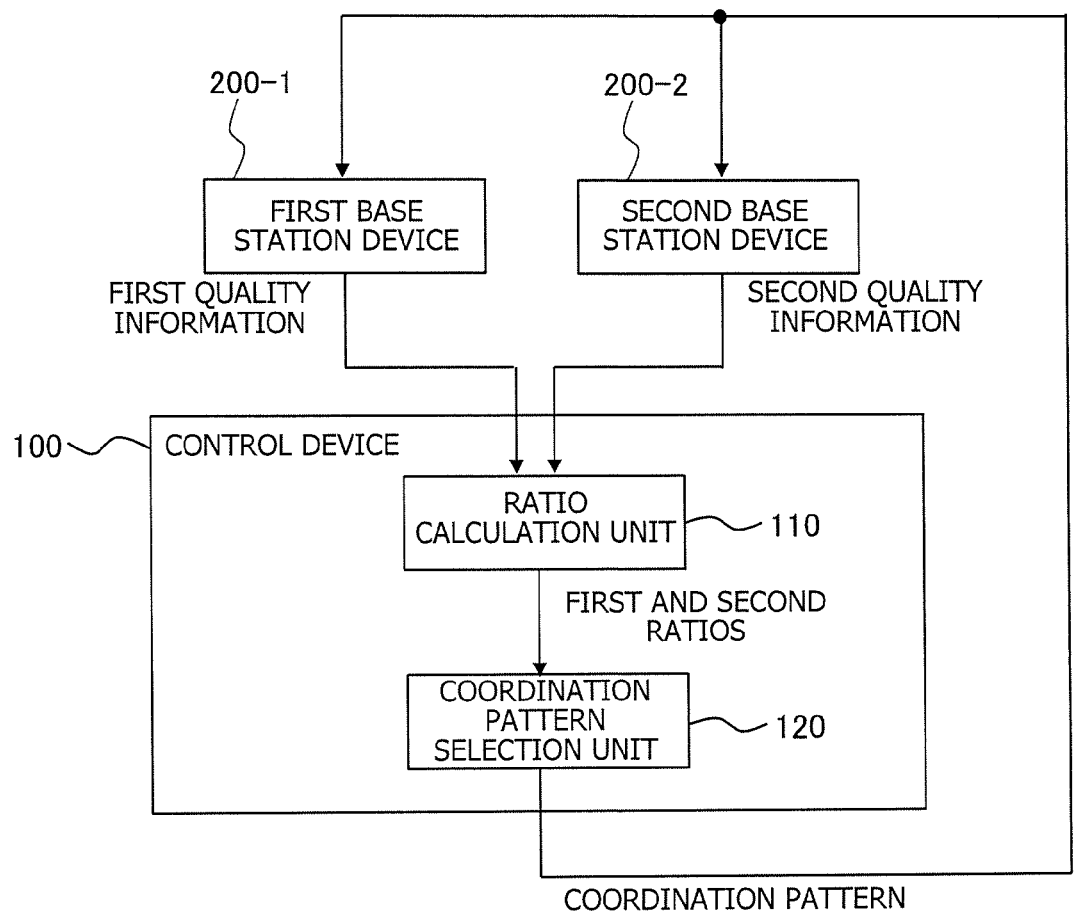
FIG. 1 is a diagram illustrating an example of a configuration of a wireless communication system.

A first embodiment will be described. FIG. 1 illustrates an example of a configuration of a wireless communication system 10 in the first embodiment.

The wireless communication system 10 includes a control device 100 and first and second base station devices 200-1 and 200-2.

Each of the first and second base station devices 200-1 and 200-2 is, for example, a wireless communication device that performs wireless communication with a mobile station device. Each of the first and second base station devices 200-1 and 200-2 is able to provide various services such as a call service by performing wireless communication with, for example, a mobile station device that exists within the service provision range of the station itself. The first and second base station devices 200-1 and 200-2 transmit, for example, first and second pieces of quality information, respectively, with the mobile station devices in wireless sections, to a control device.

The control device 100 includes a ratio calculation unit 110 and a coordination pattern selection unit 120.

Based on the first and second pieces of quality information transmitted by the first and second base station devices 200-1 and 200-2, respectively, the ratio calculation unit 110 calculates a first ratio and a second ratio. The first ratio is a ratio of wireless communication performed by the first and second base station devices 200-1 and 200-2 in coordination with each other, and the second ratio is a ratio of wireless communication performed by the first base station device 200-1 without coordination between the first and second base station devices 200-1 and 200-2.

During time periods, based on the first and second ratios, the coordination pattern selection unit 120 selects a coordination pattern indicating whether or not to perform coordinated communication with respect to the first and second base station devices. The coordination pattern selection unit 120 transmits the selected coordination pattern to the first and second base station devices 200-1 and 200-2. The time period is, for example, a subframe time period and is a scheduling time period during which scheduling is performed in the first and second base station devices 200-1 and 200-2.

The first and second base station devices 200-1 and 200-2 receive the coordination pattern. In accordance with, for example, the coordination pattern, the first base station device 200-1 that receives the coordination pattern performs wireless communication with the mobile station device in coordination with the second base station device 200-2 or single-handedly performs wireless communication with the mobile station device without coordination with the second base station device 200-2.

In this way, in the present first embodiment, in the control device 100, the first and second ratios are preliminarily calculated, the uniform first and second ratios are used during time periods, and a coordination pattern is selected based on the relevant first and second ratios.

Accordingly, in the present first embodiment, during each of time periods, selection processing for a coordination pattern is performed while not performing calculation processing for the first and second ratios, and compared with a case where the calculation processing and the selection processing are performed during each of the time periods, it is possible to achieve the reduction of a calculation amount.

Second Embodiment

Next, a second embodiment will be described.

Example of Configuration of Wireless Communication System

Figure 2:
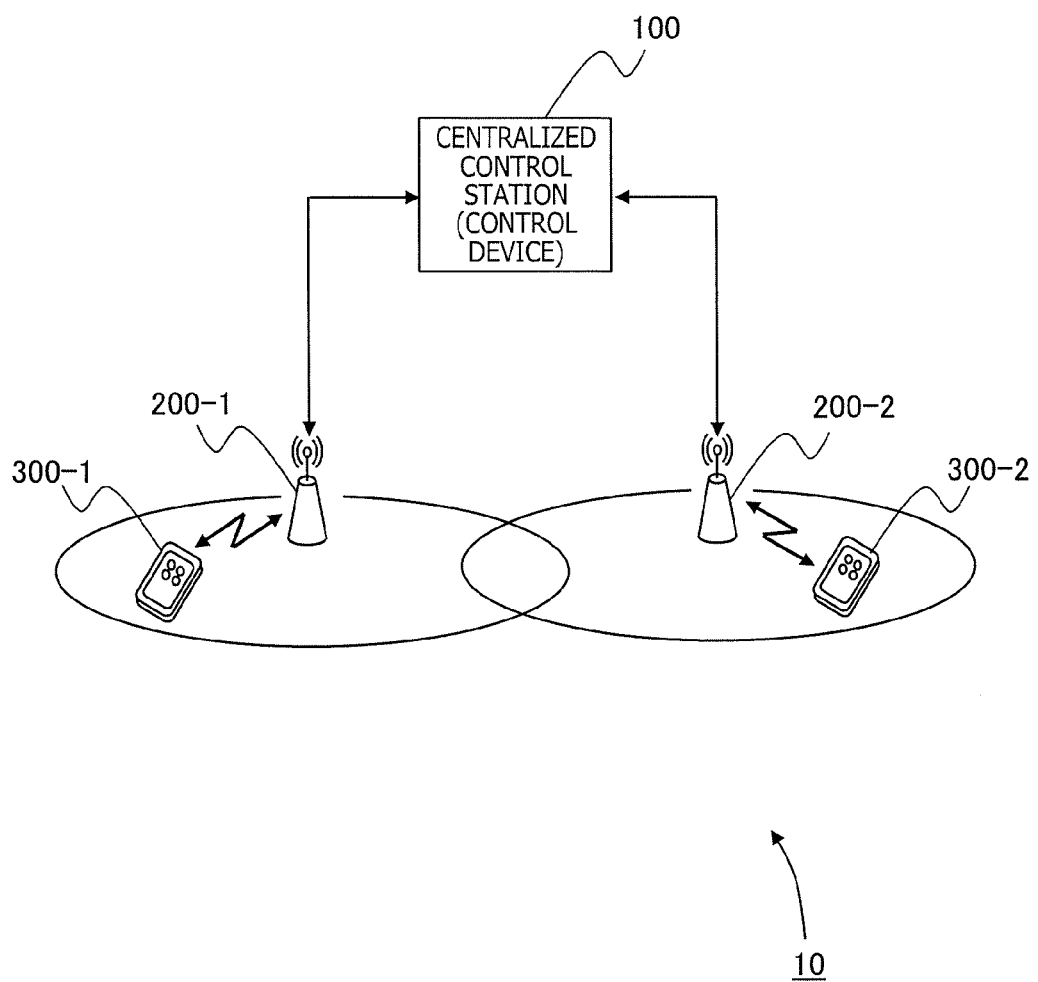
FIG. 2 is a diagram illustrating an example of a configuration of the wireless communication system.

An example of a configuration of a wireless communication system will be described. FIG. 2 is a diagram illustrating an example of a configuration of the wireless communication system 10. The wireless communication system 10 includes a centralized control station device (or a control device, and hereinafter called a "centralized control station" in some cases) 100, base station devices (hereinafter called "base stations" in some cases) 200-1 and 200-2, and mobile station devices (hereinafter called "mobile stations" in some cases) 300-1 and 300-2.

The centralized control station 100 controls the base stations 200-1 and 200-2. In the present second embodiment, the centralized control station 100 receives pieces of quality information transmitted by the base stations 200-1 and 200-2, determines a coordination pattern, based on the pieces of quality information, and notifies the base stations 200-1 and 200-2 of information regarding the determined coordination pattern.

The coordination pattern indicates, for example, a pattern about how the base stations 200-1 and 200-2 perform coordinated communication. For example, FIG. 11B to FIG. 11E each illustrate an example of the coordination pattern. As illustrated in these drawings, a "Pattern #1" illustrates an example of the coordination pattern in a case where none of three base stations perform coordinated communication, a "Pattern #2" illustrates an example of the coordination pattern in a case where two base stations perform coordinated communication and a remaining base station performs no coordinated communication. The coordination pattern indicates, for example, whether coordinated communication is performed with the individual base stations 200-1 and 200-2 or coordinated communication is not performed therewith. As illustrated in, for example, FIG. 11B, the coordination pattern may include a pattern in a case of not performing coordinated communication.

Returning to FIG. 2, the base stations 200-1 and 200-2 are wireless communication devices that perform wireless communication with the respective mobile stations 300-1 and 300-2 in, for example, the service provision ranges of the stations themselves and that provide various service such as call services and Web browsing services. In accordance with the information regarding the coordination pattern, given notice of by the centralized control station 100, the base stations 200-1 and 200-2 perform wireless communication with the mobile stations 300-1 and 300-2 by performing coordinated communication with the other base stations 200-2 and 200-1, respectively. Alternatively, in accordance with the information regarding the coordination pattern, the base stations 200-1 and 200-2 single-handedly perform wireless communication with the mobile stations 300-1 and 300-2, respectively, while not performing coordinated communication.

As kinds of the coordinated communication, there are, for example, a joint processing (JT) method, a coordinated beam forming/coordinated scheduling (CB/CS) method, and so forth. The JT method is, for example, a method in which data is simultaneously transmitted from points, and the CB/CS method is, for example, a method in which the base stations 200-1 and 200-2 determine beam forming and scheduling in coordination with each other while the one base station 200-1 transmits data. In the present second embodiment, a method for coordinated communication may be any type of method.

Each of the mobile stations 300-1 and 300-2 is a wireless communication device such as, for example, a feature phone, a smartphone, a personal computer, or a game device. In the service provision ranges of the base stations 200-1 and 200-2, the mobile stations 300-1 and 300-2 are able to be provided with various services by performing wireless communication with the base stations 200-1 and 200-2, respectively. In addition, by the mobile station 300-1 performing wireless communication by using coordinated communication based on the base stations 200-1 and 200-2, a throughput is improved and it is possible to achieve enhancement of communication performance, compared with a case where no coordinated communication is performed.

Note that the number of the base stations 200-1 and 200-2 connected to the centralized control station 100 may be three or more, and the number of the mobile stations 300-1 or 300-2 that performs wireless communication with the individual base stations 200-1 or 200-2 may be two or more.

In addition, in the present second embodiment, the individual base stations 200-1 and 200-2 are called "cells" or the individual base stations 200-1 and 200-2 and the service provision ranges of the respective base stations 200-1 and 200-2 are collectively called "cells", in some cases. Alternatively, the service provision ranges of the respective base stations 200-1 and 200-2 are called "cell ranges" in some cases. Furthermore, in the present second embodiment, the mobile stations 300 are called "users" in some cases.

Furthermore, the base stations 200-1 and 200-2 are called base stations 200, and the mobile stations 300-1 and 300-2 are called mobile stations 300, in some cases.

Next, an example of a configuration of each of the centralized control station 100, the base station 200, and the mobile station 300 included in the wireless communication system 10 will be described.

Examples of Configurations of Centralized Control Station and Base Station

Figure 3:
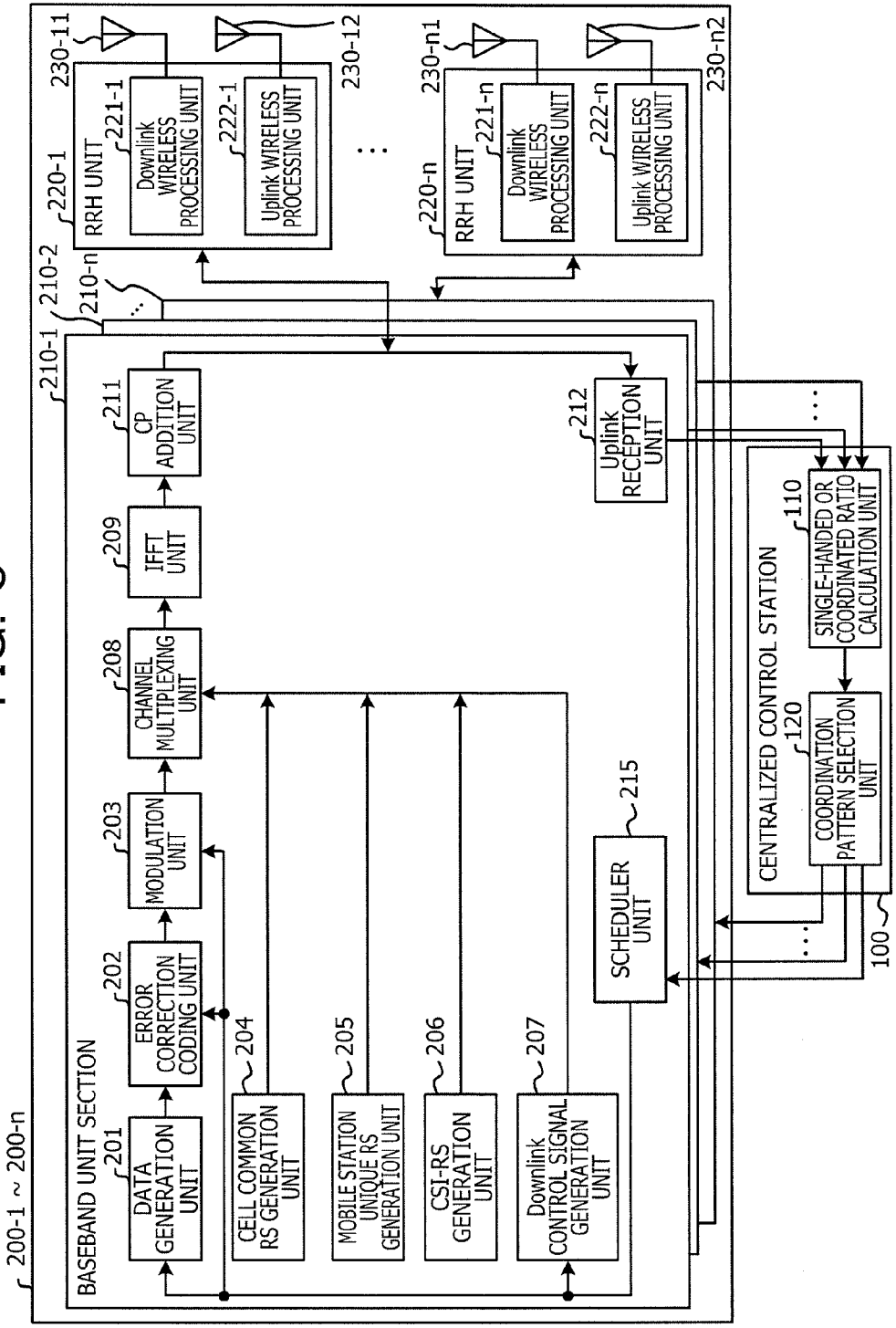
FIG. 3 is a diagram illustrating examples of configurations of a centralized control station and a base station.

FIG. 3 illustrates examples of configurations of the centralized control station 100 and the base stations 200. In FIG. 3, the base station 200-1 includes a baseband unit section (hereinafter, called a "baseband unit" in some cases) 210-1, a remote radio head (RRH) unit 220-1, and antennas 230-11 and 230-12. In addition, the base station 200-2 includes a baseband unit 210-2, an RRH unit 220-2, and antennas 230-21 and 230-22. FIG. 3 illustrates an example in which such n base stations 200-1 to 200-n (n: an integer greater than or equal to two) exist.

While FIG. 3 illustrates an example in which the one RRH unit 220-1 is connected to the one baseband unit 210-1, the RRH units 220-1 to 220-n may be connected to the one baseband unit 210-1.

In addition, the individual baseband units 210-1 to 210-n and the respective RRH units 220-1 to 220-n may be installed at locations physically separated by distances such as, for example, several meters to several kilometers.

The centralized control station 100 includes a single-handed or coordinated ratio calculation unit (hereinafter, called a "ratio calculation unit" in some cases) 110 and the coordination pattern selection unit 120.

The ratio calculation unit 110 receives pieces of quality information transmitted by the respective base stations 200-1 to 200-n and calculates, based on the pieces of quality information, an implementation ratio in a case where the base stations 200-1 to 200-n perform coordinated communication and an implementation ratio in a case where the base stations 200-1 to 200-n do not perform coordinated communication.

The implementation ratio in a case of performing coordinated communication indicates, for example, the allocation rate of wireless resources allocated to all mobile stations 300 belonging to the base stations 200-1 and 200-2 in a case where the base station 200-1 performs wireless communication with the mobile stations 300 in coordination with the other base station 200-2. If a wireless resource allocated to the mobile stations 300 with a combination of a case of performing coordinated communication with base stations 200 and a case of not performing coordinated communication therewith is, for example, "1", the implementation ratio in a case of performing coordinated communication expresses a ratio indicating the amount of wireless resources out of "1", allocated to coordinated communication.

On the other hand, the implementation ratio in a case of not performing coordinated communication expresses, for example, the allocation rate of wireless resources allocated to all mobile stations 300 belonging to the base station 200-1 in a case where the base station 200-1 single-handedly performs wireless communication with the mobile stations 300 without coordination with the other base station 200-2. If a wireless resource allocated to the mobile stations 300 with a combination of a case of performing coordinated communication with base stations 200 and a case of not performing coordinated communication therewith is, for example, "1", the implementation ratio in a case of not performing coordinated communication expresses the amount of wireless resources out of "1", allocated as wireless resources in a case of not performing coordinated communication.

In addition, that the mobile station 300 "belongs to" the base station 200-1 means that the mobile station 300 exists within, for example, the cell range of the base station 200-1. In some case, that the mobile station 300 belongs to the base station 200-1 is expressed in, for example, such a way that the mobile station 300 is controlled by the base station 200-1.

Details of calculation processing for the implementation ratio in the ratio calculation unit 110 will be described later.

The coordination pattern selection unit 120 receives information regarding two implementation ratios, output by the ratio calculation unit 110, and selects a coordination pattern, based on the two implementation ratios. The coordination pattern selection unit 120 calculates, for example, proportional fairness (PF) metrics for the two implementation ratios and selects a coordination pattern, based on the calculated PF metrics. The PF metric expresses, for example, a ratio of an instantaneous value to an average value. Here, the PF metric expresses, for example, a ratio of an instantaneous implementation ratio to an average implementation ratio. Details of coordination pattern selection processing in the coordination pattern selection unit 120 will be described in an example of an operation. The coordination pattern selection unit 120 transmits, to the base station 200, information regarding the selected coordination pattern.

The baseband unit 210-1 includes a data generation unit 201, an error correction coding unit 202, a modulation unit 203, a cell common reference signal (RS) generation unit 204, a mobile station unique RS generation unit 205, a channel state information (CSI)-RS generation unit 206, and a Downlink control signal generation unit 207. In addition, the baseband unit 210-1 includes a channel multiplexing unit 208, an inverse fast Fourier transfer (IFFT) unit 209, a cyclic prefix (CP) addition unit 211, an Uplink reception unit 212, and a scheduler unit (hereinafter, called a "scheduler" in some cases) 215.

The data generation unit 201 receives a scheduling result output by the scheduler 215 and generates data addressed to the specified mobile station 300 in accordance with the relevant scheduling result. The data generation unit 201 outputs the generated data to the error correction coding unit 202.

The error correction coding unit 202 receives modulation and coding scheme (MCS) information output by the scheduler 215 and subjects the data output by the data generation unit 201 to error correction coding (hereinafter, called "coding" in some cases) processing by using a coding rate specified by the relevant MCS information. The error correction coding unit 202 outputs, to the modulation unit 203, the coded data subjected to the coding processing.

The modulation unit 203 receives the MCS information output by the scheduler 215 and subjects the coded data output by the error correction coding unit 202 to modulation processing by using a modulation method specified by the relevant MCS information. The modulation unit 203 outputs, to the channel multiplexing unit 208, modulated data subjected to the modulation processing.

The cell common RS generation unit 204 generates a cell common RS signal. The cell common RS signal is, for example, a reference signal used for channel estimation and so forth for demodulating data in the mobile station 300.

The mobile station unique RS generation unit 205 generates a mobile station unique RS signal. The mobile station unique RS signal is, for example, a reference signal used for channel estimation and so forth for demodulating a cell unique annunciation channel. The cell common RS signal and the mobile station unique RS signal are called "demodulation RS signals" in some cases.

The CSI-RS generation unit 206 generates a CSI-RS signal. The CSI-RS signal is, for example, a reference signal used for estimating, in the mobile station 300, a channel quality indicator (CQI), a precoding matrix indicator (PMI), a rank indicator (RI), and reference signal received power (RSRP). CQI, PMI, RI, RSRP, and so forth are called, for example, channel quality information in some cases. In the mobile station 300, the channel quality information is estimated (or measured) based on the CSI-RS signal, and the estimated channel quality information is transmitted, as a CSI report, to the base station 200.

The Downlink control signal generation unit 207 generates a control signal including the MCS information and a scheduling result about each of the mobile stations 300, output by the scheduler 215. The Downlink control signal generation unit 207 outputs the generated control signal to the channel multiplexing unit 208.

The channel multiplexing unit 208 multiplexes the following five signals. In other words, these are the data output by the modulation unit 203, the cell common RS signal output by the cell common RS generation unit 204, the mobile station unique RS signal output by the mobile station unique RS generation unit 205, the CSI-RS signal output by the CSI-RS generation unit 206, and the control signal. The channel multiplexing unit 208 outputs, to the IFFT unit 209, a multiplexed signal obtained by multiplexing.

The IFFT unit 209 subjects the multiplexed signal to IFFT processing, thereby generating an effective symbol, and outputs the generated effective symbol to the CP addition unit 211.

The CP addition unit 211 generates an orthogonal frequency division multiplexing (OFDM) symbol by adding CP to the effective symbol. The CP addition unit 211 outputs the generated OFDM symbol to the RRH unit 220-1.

The Uplink reception unit 212 subjects, to demodulation processing and error correction decoding processing, a baseband signal output by the RRH unit 220-1, thereby extracting quality information transmitted by the corresponding mobile station 300. The Uplink reception unit 212 outputs the extracted quality information to the ratio calculation unit 110 in the centralized control station 100.

Based on the information regarding the coordination pattern, output by the coordination pattern selection unit 120 in the centralized control station 100, the scheduler 215 allocates wireless resources to the mobile station 300. In a case of performing the coordinated communication, the scheduler 215 may allocate wireless resources in coordination with the scheduler in the baseband unit 210-2 in another base station 200-2. The scheduler 215 outputs, as a scheduling result, for example, an allocation result of the wireless resources to the data generation unit 201 and the Downlink control signal generation unit 207.

In addition, the scheduler 215 determines a coding rate, a modulation method, and so forth in a case of performing wireless communication with the mobile station 300 and generates MCS information including the determined coding rate and modulation method. The scheduler 215 outputs the generated MCS information to the error correction coding unit 202, the modulation unit 203, and the Uplink reception unit 212.

Note that since the other baseband units 210-2 to 210-$n$ each have the same configuration as that of the baseband unit 210-1, the descriptions thereof will be omitted.

The RRH unit 220-1 includes a Downlink wireless processing unit 221-1 and an Uplink wireless processing unit 222-1.

The Downlink wireless processing unit 221-1 subjects the OFDM symbol output by the CP addition unit 211 to processing for frequency conversion to a wireless band (up-conversion), digital-to-analogue (D-A) conversion processing, and so forth, thereby generating a wireless signal. The Downlink wireless processing unit 221-1 outputs the generated wireless signal to the antenna 230-11.

The antenna 230-11 transmits the wireless signal to the mobile station 300. A communication direction from the base station 200 toward the mobile station 300 is called Downlink communication in some cases.

The antenna 230-12 receives a wireless signal transmitted by the mobile station 300 and outputs the received wireless signal to the Uplink wireless processing unit 222-1. A communication direction from the mobile station 300 toward the base station 200 is called Uplink communication in some cases.

The Uplink wireless processing unit 222-1 subjects the wireless signal output by the antenna 230-12 to A-D conversion processing and frequency conversion processing (down-conversion), thereby generating a baseband signal in a baseband band. The Uplink wireless processing unit 222-1 outputs the generated baseband signal to the Uplink reception unit 212.

Note that the other RRH unit 220-$n$ has the same configuration as that of the RRH unit 220-1 and antennas 230-$n$1 and 230-$n$2 have the same configurations as those of the antennas 230-11 and 230-12, respectively.

Example of Mobile Station

Figure 4:
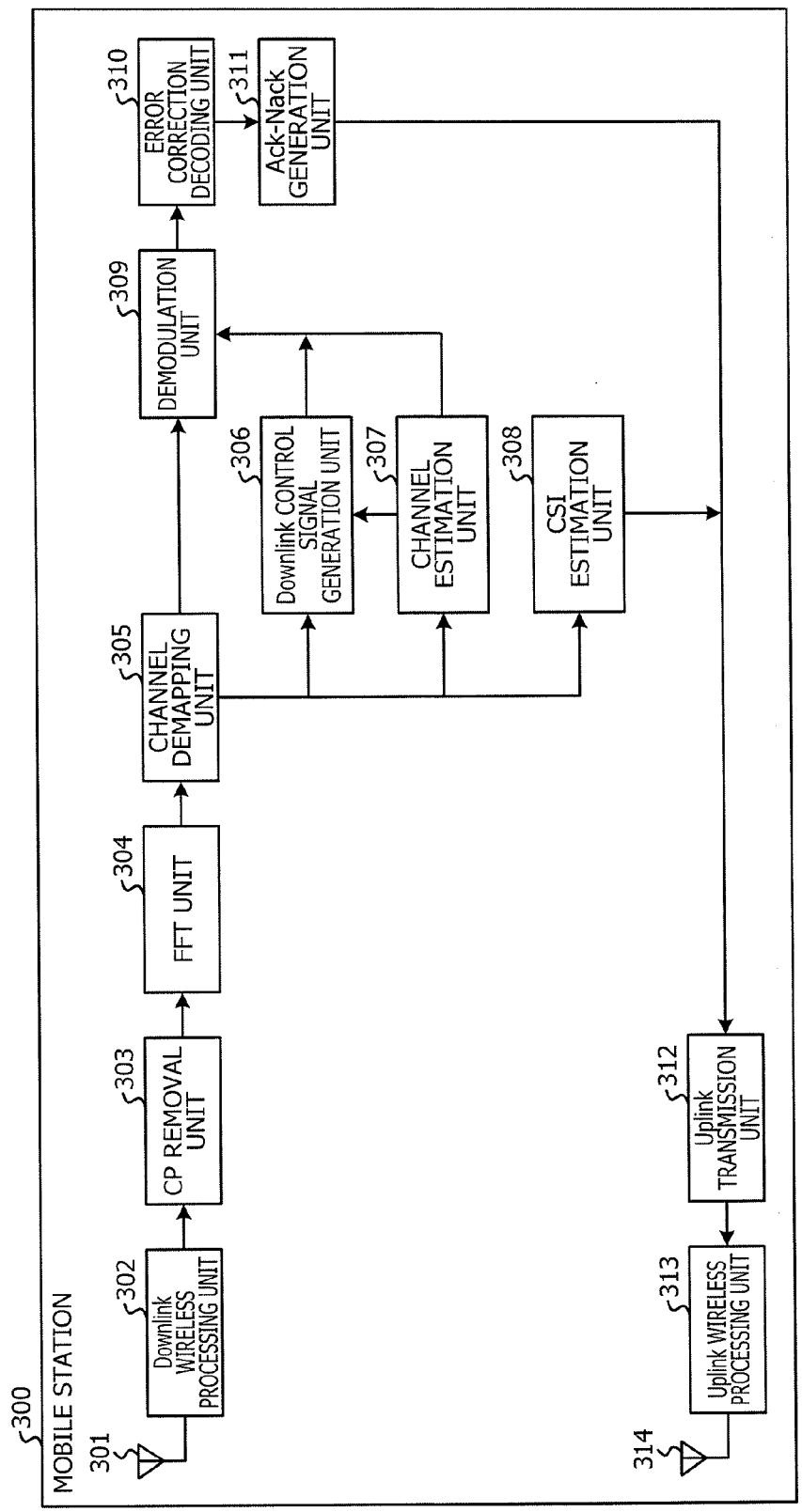
FIG. 4 is a diagram illustrating an example of a configuration of a mobile station.

Next, an example of a configuration of the mobile station 300 will be described. FIG. 4 is a diagram illustrating an example of configurations of the mobile stations 300.

The mobile stations 300 each includes an antenna 301, a Downlink wireless processing unit 302, a CP removal unit 303, an FFT unit 304, channel demapping unit 305, a Downlink control signal demodulation decoding unit 306, a channel estimation unit 307, and a CSI estimation unit 308. In addition, the mobile stations 300 each include a demodulation unit 309, an error correction decoding unit 310, an Ack-Nack generation unit 311, an Uplink transmission unit 312, an Uplink wireless processing unit 313, and an antenna 314.

The antenna 301 receives a wireless signal transmitted by the corresponding base station 200 and outputs the received wireless signal to the Downlink wireless processing unit 302.

The Downlink wireless processing unit 302 performs, on the wireless signal, A-D conversion processing and frequency conversion processing (down-conversion), thereby extracting an OFDM symbol, and outputs the extracted OFDM symbol to the CP removal unit 303.

The CP removal unit 303 removes CP from the OFDM symbol, thereby obtaining an effective symbol, and outputs the relevant effective symbol to the FFT unit 304.

The FFT unit 304 subjects the effective symbol to fast Fourier transfer (FFT) processing, thereby extracting a multiplexed signal, and outputs the extracted multiplexed signal to the channel demapping unit 305.

The channel demapping unit 305 separates a data signal, a demodulation RS signal, a CSI-RS signal, and a control signal from the multiplexed signal. The channel demapping unit 305 outputs the data signal, the control signal, the demodulation RS signal, and the CSI-RS signal to the demodulation unit 309, the Downlink control signal demodulation decoding unit 306, the channel estimation unit 307, and the CSI estimation unit 308, respectively.

The Downlink control signal demodulation decoding unit 306 demodulates the control signal by using a channel estimation value output by the channel estimation unit 307 and extracts MCS information and a scheduling result from the control signal. The Downlink control signal demodulation decoding unit 306 outputs, to the demodulation unit 309, the extracted MCS information and scheduling result. In addition, the Downlink control signal demodulation decoding unit 306 outputs the MCS information to the error correction decoding unit 310.

The channel estimation unit 307 performs channel estimation by using the demodulation RS signal. The channel estimation unit 307 outputs the channel estimation value, obtained by channel estimation, to the Downlink control signal demodulation decoding unit 306 and the demodulation unit 309.

Using the CSI-RS signal, the CSI estimation unit 308 estimates channel quality (CQI, PMI, RI, RSRP, and so forth) and outputs, as channel quality information (or CSI information), an estimated result to the Uplink transmission unit 312. The channel quality is channel quality in, for example, a downlink communication direction.

Using the channel estimation value, the demodulation unit 309 demodulates data addressed to the station itself, in accordance with the MCS information and the scheduling result.

In accordance with the MCS information, the error correction decoding unit 310 subjects the data output by the demodulation unit 309 to error correction decoding processing, thereby decoding the data.

The Ack-Nack generation unit 311 generates an Ack signal in a case of succeeding in demodulating and error-correction-decoding the data and generates a Nack signal in a case of failing in demodulating and error-correction-decoding the data. The Ack-Nack generation unit 311 outputs the generated Ack signal or Nack signal to the Uplink transmission unit 312.

The Uplink transmission unit 312 subjects the CSI information, the Ack signal or Nack signal, and user data to error correction coding processing and modulation processing, thereby generating an OFDM symbol. The Uplink transmission unit 312 outputs the generated OFDM symbol to the Uplink wireless processing unit 313.

The Uplink wireless processing unit 313 subjects the OFDM symbol to processing for frequency conversion to a wireless frequency band (up-conversion) and D-A conversion processing, thereby generating a wireless signal, and outputs the generated wireless signal to the antenna 314. The antenna 314 transmits the wireless signal to the base station 200.

Example of Operation

Next, an example of an operation in the wireless communication system 10 will be described. The example of an operation will be described in the following order.

1. Example of Operation of Entire Wireless Communication System,
1.1 Calculation Processing for Implementation Ratio,
1.2 Selection Processing for Coordination Pattern,
1.3 Advantageous Effect, and
2. Another Example of Operation.

1. Example of Operation of Entire Wireless Communication System

Figure 5:
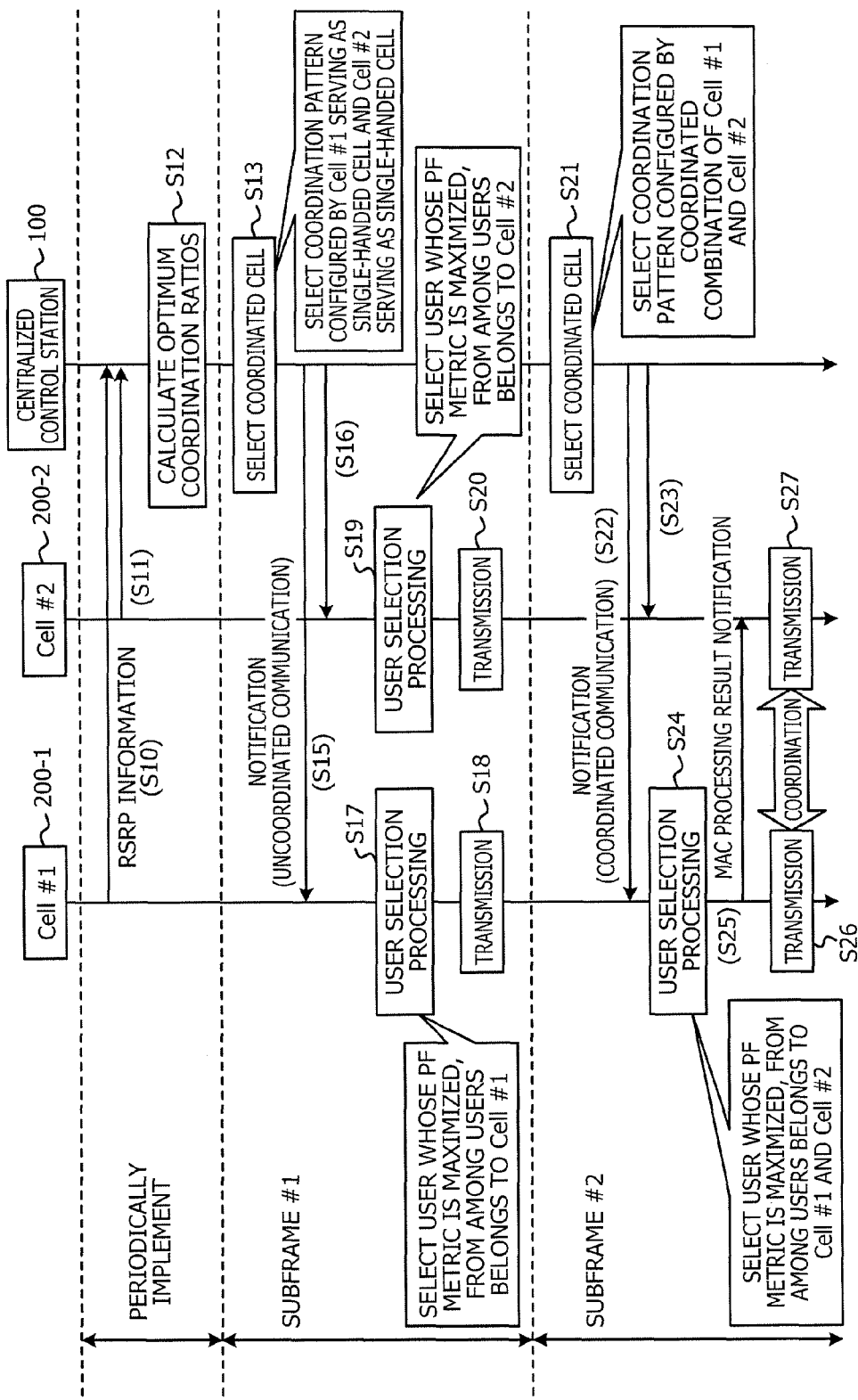
FIG. 5 is a sequence diagram illustrating an example of an operation of the entire wireless communication system.

FIG. 5 illustrates an example of an operation of the entire wireless communication system 10. In FIG. 5, "Cell #1" indicates the base station 200-1, and "Cell #2" indicates the base station 200-2.

Upon receiving RSRP information measured by the corresponding mobile station 300, each of the base stations 200-1 and 200-2 transmits the received RSRP information to the centralized control station 100 (S10 or S11).

Based on the RSRP information, the centralized control station 100 calculates two implementation ratios (or optimum coordination ratios) of an implementation ratio in a case where the base station 200-1 performs wireless communication in coordination with the base station 200-2 and an implementation ratio in a case where the base station 200-1 performs wireless communication without coordination therewith (S12). The ratio calculation unit 110 performs, for example, calculation processing for the implementation ratios. Details thereof will be described in "1.1 Calculation Processing for Implementation Ratio".

Next, based on the implementation ratios, the centralized control station 100 selects a coordination pattern (or a coordinated cell) (S13). The coordination pattern selection unit 120 performs, for example, selection processing for the coordination pattern. Details thereof will be described in "1.2 Selection Processing for Coordination Pattern". In the example of FIG. 5, as for the two base stations 200-1 and 200-2, the centralized control station 100 selects a coordination pattern in which wireless communication is single-handedly performed without performing coordinated communication.

Next, the centralized control station 100 notifies each of the base stations 200-1 and 200-2 of information regarding the selected coordination pattern (S15 or S16). In the example of FIG. 5, the centralized control station 100 transmits, to each of the base stations 200-1 and 200-2, information regarding the coordination pattern indicating that wireless communication is single-handedly performed without performing coordinated communication.

Upon receiving the information regarding the coordination pattern, the base station 200-1 performs user selection processing (S17). From among users belonging to the base station 200-1, the scheduler 215 selects, for example, a user whose PF metric is maximized. Details thereof will be described in "1.2 Selection Processing for Coordination Pattern".

Next, the base station 200-1 transmits data to the user selected in the user selection processing (S18). For example, for the selected user, the scheduler 215 allocates a wireless resource and determines MCS, thereby transmitting data.

On the other hand, upon receiving the information regarding the coordination pattern, the base station 200-2 performs user selection processing (S19). In this case, from among users belonging to the base station 200-2, the scheduler 215 in the base station 200-2 selects, for example, a user whose PF metric is maximized. In addition, the base station 200-2 transmits data to the user selected in the user selection processing (S20).

In the example of FIG. 5 an example in which the centralized control station 100 does not perform coordinated communication in a "subframe #1" is illustrated, and an example in which the centralized control station 100 performs coordinated communication in a "subframe #2" serving as a subframe time period subsequent to the "subframe #1" is illustrated.

In this case, by performing coordination pattern selection processing, the centralized control station 100 selects a coordination pattern in which the two base stations 200-1 and 200-2 perform coordinated communication together with each other (S21). In addition, the centralized control station 100 transmits, to the two base stations 200-1 and 200-2, information regarding the selected coordination pattern (S22 and S23).

Upon receiving the information regarding the coordination pattern, the base station 200-1 performs user selection processing (S24). In this case, from among users belonging to the two base stations 200-1 and 200-2, the scheduler 215 selects, for example, a user whose PF metric is maximized. This selection processing will be described in "1.2 Selection Processing for Coordination Pattern".

Next, the base station 200-1 notifies the base station 200-2 of a MAC processing result (S25). In addition, the two base stations 200-1 and 200-2 perform coordinated communication on the corresponding terminal 300 (S26 and S27).

1.1 Calculation Processing for Implementation Ratio

Figure 6:
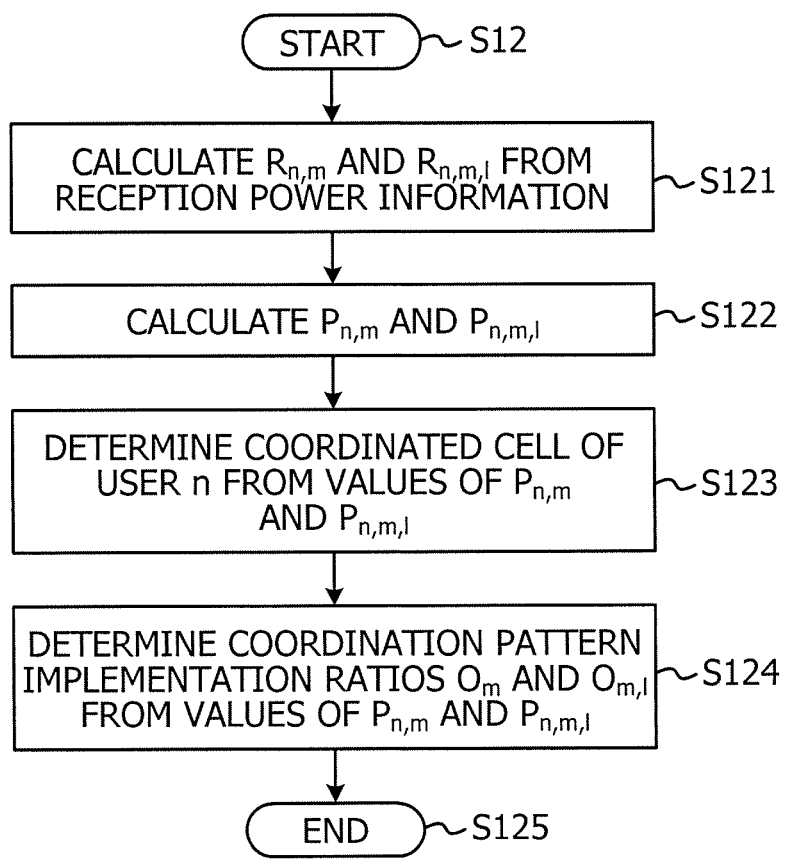
FIG. 6 is a flowchart illustrating an example of an operation of implementation ratio calculation processing.
Figure 7:
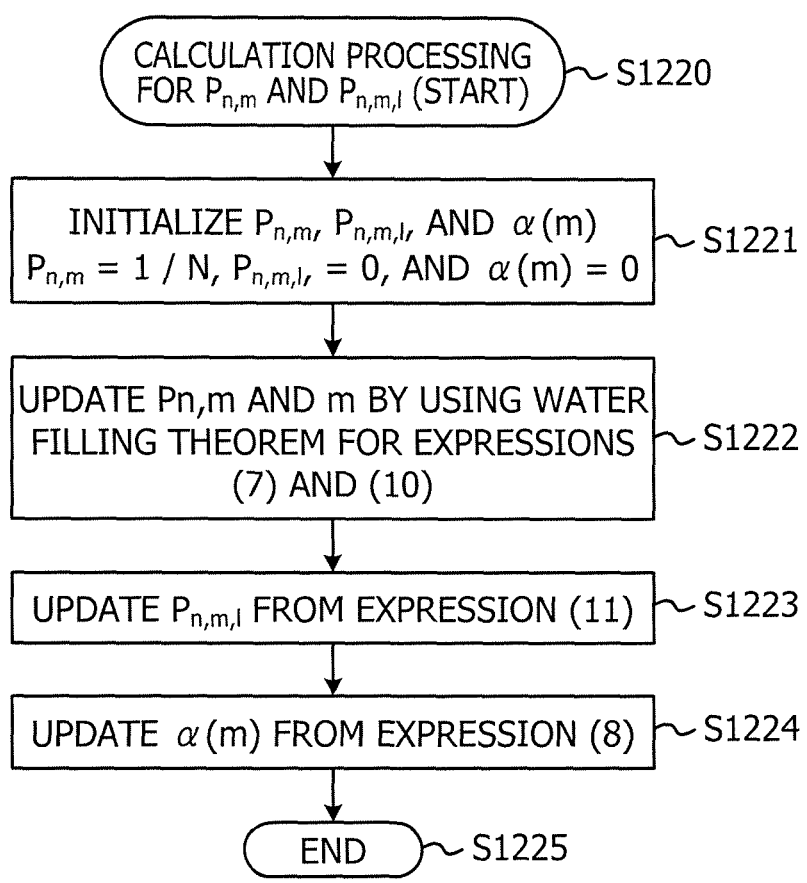
FIG. 7 is a flowchart illustrating an example of an operation of ratio calculation processing.

Next, the calculation processing for an implementation ratio (S12) will be described. FIG. 6 and FIG. 7 are flowcharts each illustrating an example of an operation of calculation processing for an implementation ratio.

Note that, in the example of an operation illustrated as follows, processing is performed using mathematical expressions in some cases. Such mathematical expressions are stored in, for example, an internal memory of the ratio calculation unit 110, and it is assumed that the ratio calculation unit 110 reads the mathematical expressions from the internal memory, performs, for example, processing for substituting values into the mathematical expressions, and stores processing results thereof in the internal memory, thereby performing the processing.

Upon starting the processing (S12), the ratio calculation unit 110 calculates expected throughputs $R_{n,m}$ and $R_{n,m,l}$, based on RSRP information (S121).

The expected throughput $R_{n,m}$ indicates an expected throughput obtained in a user n in a case where wireless communication is performed by the m-th base station 200 (for example, the base station 200-1) without performing coordinated communication. The reason why being expressed as an "expected throughput" is that a throughput is defined as that obtained in a case where the user n occupies, for example, an entire band of wireless resources, thereby performing wireless communication.

In addition, the expected throughput $R_{n,m,l}$ indicates an expected throughput obtained in the user n by the m-th base station 200 and the l-th base station 200 (for example, the base station 200-2) performing coordinated communication.

The ratio calculation unit 110 calculates the expected throughputs $R_{n,m}$ and $R_{n,m,l}$, for example, as follows. In other words, if reception power information for the m-th base station 200, reported by the user n, is $P_{n,m}$ (for example, S10 in FIG. 5) and reception power information for the l-th base station 200, reported by the user n, is $P_{n,l}$ (for example, S11 in FIG. 5), reception qualities $SINR_{n,m}$ and $SINR_{n,m,l}$ are calculated in accordance with the following respective Expressions.

$$SINR_{n,m} = \frac{P_{n,m}}{N_{th} + \sum_{j \neq m} P_{n,j}} \quad (1)$$

$$SINR_{n,m,l} = \frac{P_{n,m} + P_{n,l}}{N_{th} + \sum_{j \neq m,l} P_{n,j}} \quad (2)$$

Here, the reception quality $SINR_{n,m}$ indicates a reception quality obtained in the user n in a case where the user n performs wireless communication with the m-th base station 200 without performing coordinated communication. In addition, the reception quality $SINR_{n,m,l}$ indicates a reception quality obtained in the user n in a case of performing wireless communication by using coordinated communication based on the m-th and l-th base stations 200. In this regard, however, in each of Expressions (1) and (2), "$N_{th}$" indicates a noise component, and a second term of a denominator indicates the total amount of reception power from base stations other than the base station 200 serving as a target.

In addition, using Shannon's theorem (or Shannon-Hartley theorem), the ratio calculation unit 110 calculates the expected throughputs $R_{n,m}$ and $R_{n,m,l}$ from the reception qualities $SINR_{n,m}$ and $SINR_{n,m,l}$ obtained in Expression (1) and Expression (2), respectively. Specifically, the ratio calculation unit 110 uses the following Expression (3) and Expression (4).

$$R_{n,m} = W \log\left(1 + \frac{SINR_{n,m}}{\alpha}\right) \quad (3)$$

$$R_{n,m,l} = W \log\left(1 + \frac{SINR_{n,m,l}}{\alpha}\right) \quad (4)$$

Here, "W" is a coefficient indicating a band width of a data signal, and "a" is a coefficient indicating deterioration from Shannon's theorem and is, for example, "2.0".

Note that, in a case of performing coherent transmission between coordinated cells so as to achieve phase matching on the corresponding mobile station 300's side, reception power is subjected to amplitude combination. Therefore, SINR is calculated in accordance with the following Expression (5). By substituting a calculation result of Expression (5) into Expression (4), the ratio calculation unit 110 may calculate the expected throughput $R_{n,m,l}$.

$$SINR_{n,m,l} = \frac{P_{n,m} + 2\sqrt{P_{n,m}P_{n,l}} + P_{n,l}}{N_{th} + \sum_{j \neq m,l} P_{n,j}} \quad (5)$$

Upon calculating the expected throughputs $R_{n,m}$ and $R_{n,m,l}$ (S121), the ratio calculation unit 110 calculates two ratios $P_{n,m}$ and $P_{n,m,l}$ (S122).

The ratio $P_{n,m}$ indicates, for example, a ratio by which the user n performs wireless communication with the m-th base station 200 without performing coordinated communication. In addition, the ratio $P_{n,m,l}$ indicates, for example, a ratio by which the user n performs wireless communication by using coordinated communication based on the m-th and l-th base stations 200.

In other words, the ratio $P_{n,m}$ indicates, for example, an allocation rate of wireless resources allocated to the user n by the m-th base station 200 in a case where the user n performs wireless communication with the m-th base station 200 without performing coordinated communication. In addition, the ratio $P_{n,m,l}$ indicates, for example, an allocation rate of wireless resources allocated to the user n by the m-th and l-th base stations 200 in a case where the user n performs coordinated communication with the m-th base station 200 and the l-th base station 200. The total sum of the two ratios $P_{n,m}$ and $P_{n,m,l}$ is, for example, "1".

The ratio calculation unit 110 calculates the two ratios $P_{n,m}$ and $P_{n,m,l}$, for example, as follows. In other words, the ratio calculation unit 110 solves a maximization problem of PF utility, expressed by the following Expression (6), thereby calculating the two $P_{n,m}$ and $P_{n,m,l}$.

maximize (6)
$$U = \frac{1}{N} \sum_{n \in UE} \log \left\{ \sum_{m \in eNB(n)} R_{n,m} p_{n,m} + \sum_{\substack{m,l \in eNB(n) \\ m \neq l}} R_{n,m,l} p_{n,m,l} \right\}$$

subject to $$\sum_{n \in UE(m)} p_{n,m} = 1 - \alpha(m) \quad (7)$$

$$\sum_{\substack{n \in UE(m,l) \\ l \in eNB(n)}} p_{n,m,l} = \alpha(m) \quad (8)$$

$$p_{n,m} \geq 0, \; p_{n,m,l} \geq 0 \quad (9)$$

Expression (7) to Expression (9) indicate conditions in a case of solving Expression (6). By solving Expression (6), the ratio calculation unit 110 obtains the ratios $P_{n,m}$ and $P_{n,m,l}$ indicated by the following Expression (10) and Expression (11).

$$p_{n,m} = \max\left(0, \frac{1}{\mu_m} - \frac{T'_{n,m}}{R_{n,m}}\right) \quad (10)$$

$$T'_{n,m} = \sum_{\substack{j \in eNB(n) \\ j \neq m}} R_{n,j} p_{n,j} + \sum_{\substack{j,k \in eNB(n) \\ j \neq k}} R_{n,j,k} p_{n,j,k}$$

$$m \in eNB(n)$$

$$p_{n,m,l} = \max\left(0, \frac{1}{\mu_m + \mu_l} - \frac{T'_{n,m,l}}{R_{n,m,l}}\right) \quad (11)$$

$$T'_{n,m,l} = \sum_{\substack{j \in eNB(n) \\ j \neq k}} R_{n,j} p_{n,j} + \sum_{\substack{j,k \in eNB(n) \\ j \neq k \\ k \neq l}} R_{n,j,k} p_{n,j,k}$$

$$m, l \in eNB(n)$$

To explain symbols in Expression (6) to Expression (11), "eNB" indicates a whole set of the base stations 200, and "UE" indicates a whole set of users. In addition, "eNB(n)" indicates a set of coordinated cell candidates of the user n, "UE(m)" indicates a set of user equipments (UEs) (or the mobile stations 300) including the m-th base station 200 as a coordinated cell candidate, and "UE(m,l)" indicates a set of UEs including the two m-th and l-th base stations 200 as coordinated cell candidates. Furthermore, "α(m)" indicates a ratio by which the m-th base station 200 performs coordinated communication. Here, the term "coordinated cell candidate" means, for example, a candidate for the base station 200 to perform coordinated communication, and the term "coordinated cell" means the base station 200 that performs coordinated communication.

The eNB(n) serving as a set of coordinated cell candidates corresponds to the base stations 200, with which the user n is likely to perform communication, and only has to be defined as base stations whose reception power is able to be measured. Alternatively, a predetermined number of base stations may be selected in descending order of reception power.

As above, a calculation method (S122 in FIG. 6) for the ratios $P_{n,m}$ and $P_{n,m,l}$ indicated by the Expression (10) and Expression (11), respectively, is described. Specifically, the ratios $P_{n,m}$ and $P_{n,m,l}$ may be calculated based on, for example, the flowchart illustrated in FIG. 7.

In other words, upon starting processing for calculating the two ratios $P_{n,m}$ and $P_{n,m,l}$ (S1220), the ratio calculation unit 110 initializes the ratios $P_{n,m}$ and $P_{n,m,l}$ and α(m) as follows (S1221).

$$P_{n,m} = \frac{1}{N},$$

$$P_{n,m,l} = 0,$$

$$\alpha(m) = 0$$

Next, using a water filling theorem for Expression (7) and Expression (10), the ratio calculation unit 110 updates the ratio $P_{n,m}$, by which the user n performs wireless communication without performing coordinated communication, and $\mu_m$ (S1222).

The water filling theorem is, for example, a theorem of how electric power is allocated to individual streams so as to maximize a communication capacity in a case where there are the streams (or channels) whose total electric power is fixed. According to the water filling theorem, it is thought that electric power higher than a threshold value is allocated to a good stream and electric power lower than the threshold value is allocated to a bad stream, thereby maximizing the communication capacity. Note that "$\mu_m$" in a right side of Expression (10) indicates a variable indicating a height in the water filling theorem.

Next, from Expression (11), the ratio calculation unit 110 updates the ratio $P_{n,m,l}$ by which the user n performs wireless communication by using coordinated communication (S1223). "$\mu_m$" is calculated in accordance with, for example, Expression (10), and "$\mu_l$" is already calculated by calculation of Expression (10) for another base station. Therefore, the ratio $P_{n,m,l}$ is able to be calculated from the first expression of Expression (11).

Next, the ratio calculation unit 110 updates α(m) from Expression (8) (S1224). In accordance with, for example, Expression (10), the ratio calculation unit 110 calculates the ratio $P_{n,m,l}$ by which each of users performs coordinated communication. Therefore, by performing this calculation for all users belonging to the m-th and l-th base stations 200, it is possible to calculate α(m).

Then, the ratio calculation unit 110 terminates the calculation processing for the ratios $P_{n,m}$ and $P_{n,m,l}$ (S1225).

Returning to FIG. 6, next the ratio calculation unit 110 determines a coordinated cell of the user n from the two ratios $P_{n,m}$ and $P_{n,m,l}$ (S123). The coordinated cell may be determined, for example, as follows.

In other words, the ratio calculation unit 110 selects $P_{n,m'}$ or $P_{n,m',l'}$ that represents the highest value among the calculated ratios $P_{n,m}$ and $P_{n,m,l}$. In a case where a ratio that represents the highest value is the ratio $P_{n,m'}$, the user n determines not to perform coordinated communication with the m'-th base station 200. On the other hand, in a case where a ratio that represents the highest value is the ratio $P_{n,m',l'}$, the user n determines to perform coordinated communication with the m'-th base station 200 and the l'-th base station 200.

Selection of the coordinated cell is performed in S13 or S21 in a subsequent stage (FIG. 5). However, in S13 or S21, based on implementation ratios of all users belonging to the base stations 200 (or an allocation rate of wireless resources allocated to all the users), the coordinated cell is selected. Since finally the coordinated cell is selected based on S13 or S21, the present processing operation (S123) may be omitted.

Returning to FIG. 6, next the ratio calculation unit 110 individually calculates, based on the two ratios $P_{n,m}$ and $P_{n,m,l}$, implementation ratios (or "coordination pattern implementation ratios" and hereinafter, called "implementation ratios" in some cases) $O_m$ and $O_{m,l}$, respectively (S124). The ratio calculation unit 110 calculates the implementation ratios $O_m$ and $O_{m,l}$ by using, for example, the following Expression (12).

$$O_m = \sum_{n \in UE(m)} p_{n,m}, \qquad (12)$$

$$O_{m,l} = \sum_{\substack{n \in UE(m,l) \\ l \in eNB(n)}} p_{n,m,l}$$

Then, the ratio calculation unit 110 terminates a series of processing operations (S125). The ratio calculation unit 110 outputs the calculated two implementation ratios $O_m$ and $O_{m,l}$ to the coordination pattern selection unit 120.

1.2 Selection Processing for Coordination Pattern

Figure 8:
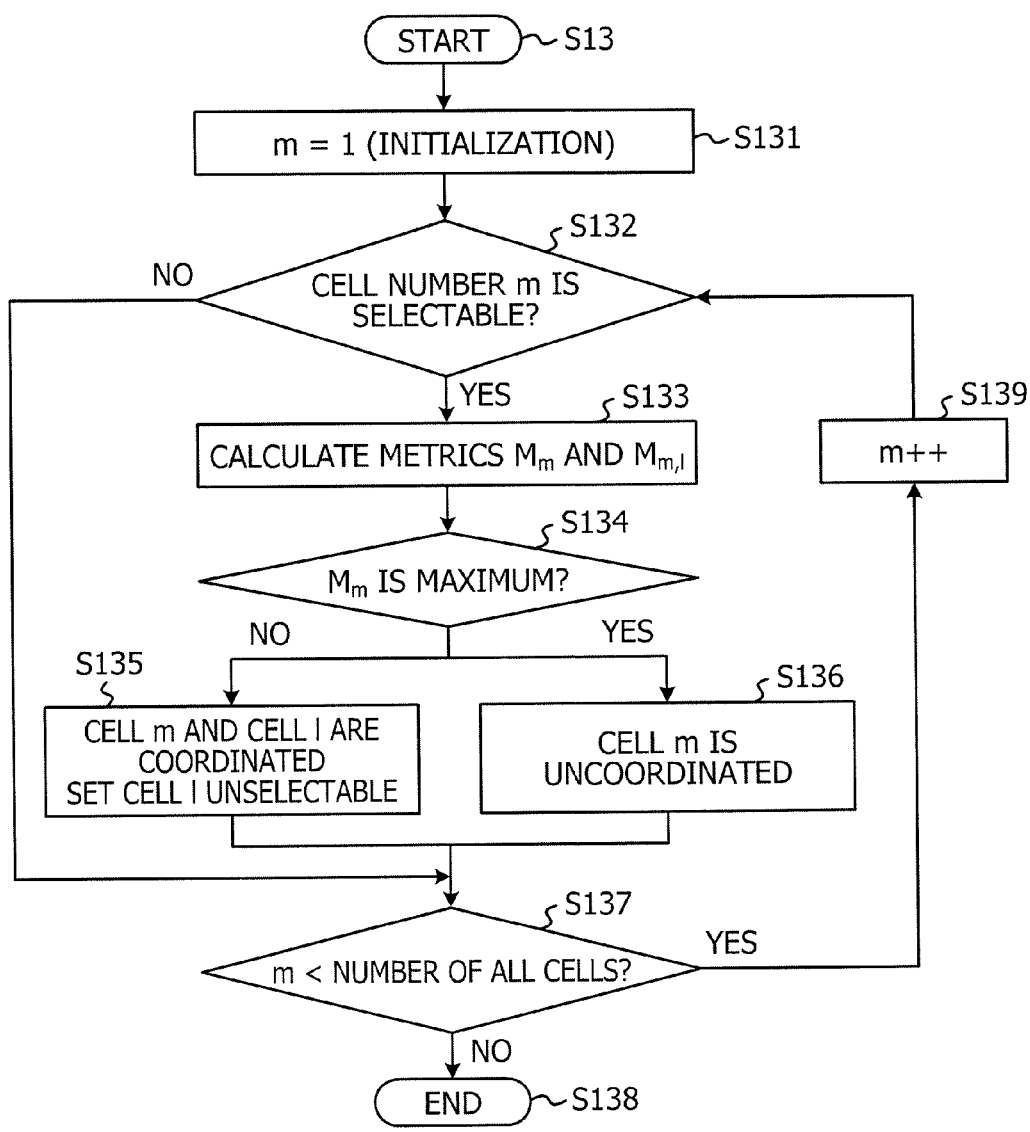
FIG. 8 is a flowchart illustrating an example of an operation of coordination pattern selection processing.

Next, an example of an operation of selection processing for a coordination pattern (S13 or S21 in FIG. 5) will be described. FIG. 8 is a flowchart illustrating an example of an operation of coordination pattern selection processing.

Note that, in the following example of an operation, the coordination pattern selection unit 120 performs processing by using mathematical expressions in some cases. The mathematical expressions are stored in, for example, an internal memory of the coordination pattern selection unit 120, and the coordination pattern selection unit 120 may read the mathematical expressions and values from the internal memory, may perform, for example, processing for substituting values into the mathematical expressions, and may store processing results thereof in the internal memory, thereby performing the processing.

Upon starting the coordination pattern selection processing (S13), the coordination pattern selection unit 120 initializes a variable m (S131). The variable m indicates, for example, a cell number. By defining "m=1", the coordination pattern selection unit 120 performs the initialization.

Next, the coordination pattern selection unit 120 determines whether or not the cell number m is selectable (S132). By setting the selected base station 200 unselectable, doubly performing, on one base station 200, determination of whether or not to perform coordinated communication is avoided. The coordination pattern selection unit 120 may judge based on, for example, flag information stored in the internal memory.

In a case of judging that the cell number m is selectable (S132: YES), the coordination pattern selection unit 120 calculates PF metrics $M_m$ and $M_{m,l}$, based on the implementation ratios $O_m$ and $O_{m,l}$ (S133). The coordination pattern selection unit 120 calculates using, for example, the following Expression.

$$M_m = \frac{O_m}{\tilde{O}_m}, \qquad (13)$$

$$M_{m,l} = \frac{O_{m,l}}{\tilde{O}_{m,l}}$$

In Expression (13), $$\tilde{O}_m, \tilde{O}_{m,l}$$

indicate, for example, an average implementation ratio in a case of not performing coordinated communication and an average implementation ratio in a case of performing coordinated communication, respectively.

Using a variable $A^n$, whose value is "1" in a case of being selected in a coordination time period n+1 and whose value is "0" if this is not the case, and a forgetting variable β, the coordination pattern selection unit 120 calculates Expression (13) in accordance with the following Expression (14).

$$\tilde{O}_{m,l}^{n+1} = (1-\beta)\tilde{O}_{m,l}^n + \beta A^n \qquad (14)$$

Next, the coordination pattern selection unit 120 judges whether or not the calculated metric $M_m$ is a maximum (S134). In other words, the coordination pattern selection unit 120 determines whether or not the metric $M_m$ is higher than, for example, the metric $M_{m,l}$.

In a case where the calculated metric $M_m$ is not a maximum (S134: NO), the coordination pattern selection unit 120 determines that the m-th and l-th base stations 200 perform coordinated communication, and the coordination pattern selection unit 120 sets the l-th base station 200 unselectable (S135). In a case where the calculated metric $M_m$ is not a maximum, in other words, in a case where the metric $M_{m,l}$ whose value is higher than that of the metric $M_m$ exists, the coordination pattern selection unit 120 determines that the m-th and l-th base stations 200 perform coordinated communication.

On the other hand, in a case where the calculated metric $M_m$ is a maximum (S134: YES), the coordination pattern selection unit 120 determines that the m-th base station 200 does not perform coordinated communication (S136).

The coordination pattern selection unit 120 determines a coordination pattern, based on S135 or S136. The coordination pattern selection unit 120 may store, in the internal memory or the like, information regarding the determined coordination pattern.

Next, the coordination pattern selection unit 120 judges whether or not the cell number m is lower than the number of all cells (S137). In a case where the cell number m is lower than the number of all cells (S137), the coordination pattern selection unit 120 increments the cell number m by one (S139) and makes a transition to the processing operation in S132. The coordination pattern selection unit 120 may store the cell number m in the internal memory or the like, thereby performing the processing.

On the other hand, in a case where the cell number m is greater than or equal to the number of all cells (S137: NO), coordination patterns turn out to be determined for all the cells. Therefore, the coordination pattern selection unit 120 terminates a series of processing operations (S138).

In addition, in a case where the cell number m is unselectable (S132: NO), the coordination pattern selection unit 120 judges whether or not the cell number is lower than the number of all the cells (S137).

The coordination pattern selection unit 120 selects the coordination patterns as above and notifies the individual base stations 200-1 and 200-2 of information regarding the determined coordination patterns (S15 or S22 in FIG. 5).

Upon receiving the information regarding the coordination patterns, each of the base stations 200-1 and 200-2 performs the user selection processing (S17, S19, or S24). In the user selection processing, processing is performed using, for example, mathematical expressions in some cases. Such mathematical expressions are stored in, for example, an internal memory of the scheduler 215, and the scheduler 215 may calculate by, for example, reading the mathematical expressions from the internal memory and substituting values thereinto, and may store processing results thereof in the internal memory, thereby performing the processing.

The selection of a coordination pattern includes the user selection processing (S17 or S19) in a case of not performing coordinated communication and the user selection processing (S24) in a case of performing coordinated communication.

The user selection processing (S17 or S19) in a case of not performing coordinated communication is performed, for example, as follows. In other words, using the following Expression (15) and Expression (17), the scheduler 215 in the base station 200-1 calculates a user UE (hereinafter, called a "maximum user UE" in some cases) whose PF metric is a maximum out of PF metrics of all users belonging to the relevant base station 200-1. In addition, using the following Expression (16) and Expression (17), the scheduler 215 in the base station 200-2 calculates a maximum user UE out of PF metrics of all users belonging to the relevant base station 200-2.

$$UE = \max_{j \in UE(m)} \frac{R_j}{\tilde{R}_j} \quad (15)$$

$$UE = \max_{j \in UE(l)} \frac{R_j}{\tilde{R}_j} \quad (16)$$

"$R_j$" in Expression (15) indicates, for example, an instantaneous throughput in a case where a wireless signal transmitted by the m-th base station 200 (for example, the base station 200-1) is defined as a desired wave, and "$R_j$" in Expression (15) is calculated in accordance with Expression (3). In addition, "$R_j$" in Expression (16) indicates, for example, an instantaneous throughput in a case where a wireless signal transmitted by the l-th base station 200 (for example, the base station 200-2) is defined as a desired wave, and "$R_j$" in Expression (16) is calculated in accordance with Expression (3).

In addition, a denominator of Expression (15) indicates, for example, an average throughput in a case where the wireless signal transmitted by the m-th base station 200 is defined as a desired wave. The scheduler 215 calculates the average throughput by using, for example, the following Expression.

$$\tilde{R}_j^{n+1} = (1-\beta)\tilde{R}_j^n + \beta B^n \quad (17)$$

In Expression (17), a variable $B^n$ indicates a variable, whose value is "1" in a case of being selected in a time period n+1 and whose value is "0" if this is not the case, and "β" indicates a forgetting factor.

A throughput expectation value (Expression (3)) is calculated in, for example, the ratio calculation unit 110 and is transmitted along with information regarding a coordination pattern via the coordination pattern selection unit 120. Accordingly, using Expression (15) to Expression (17), the scheduler 215 in each of the base stations 200-1 and 200-2 is able to calculate a maximum user UE whose PF metric is maximized.

On the other hand, in a case of performing coordinated communication, the scheduler 215 selects a user UE, whose PF metric is maximized, by using the following Expression.

$$UE = \max_{j \in UE(m,l)} \frac{R_j}{\tilde{R}_j} \quad (18)$$

"$R_j$" in Expression (18) indicates, for example, an instantaneous throughput in a case where wireless signals transmitted by both the m-th and l-th base stations 200 are defined as desired waves. "$R_j$" in Expression (18) is an instantaneous throughput calculated in accordance with, for example, Expression (4) by the ratio calculation unit 110, and in this case, "$R_j$" is able to be received from the ratio calculation unit 110 by the scheduler 215 via the coordination pattern selection unit 120.

1.3 Advantageous Effect

Next, an advantageous effect in the present second embodiment will be described. FIG. 9 illustrates an example of a calculation amount of PF metrics corresponding to a cluster size by which coordinated communication is performed.

In FIG. 9, "cluster size" indicates, for example, the number of the base stations 200 selectable in a case of performing coordinated communication. In addition, "absence of coordination" indicates, for example, a calculation amount of PF metrics in a case of not performing coordinated communication. Furthermore, "existence of coordination" indicates, for example, a calculation amount in a case where PF metrics are calculated for all users with respect to all coordination patterns. It is assumed that, in each of "absence of coordination" and "existence of coordination", such calculation is performed in, for example, every subframe time period.

FIG. 16A and FIG. 16B each illustrate an example of a calculation amount of PF metrics in a case of "existence of coordination" in a cluster size of "2".

In a case of the cluster size of "2" in "existence of coordination", the number of coordination patterns is two as illustrated in FIG. 16A and FIG. 16B. In addition, within each of coordination patterns, one or two base stations 200 exist. If the number of all users belonging to each of the base stations 200 is "N", the PF metrics of all users belonging to the two base stations are calculated in a case of not performing coordinated communication, and therefore, "2N" is obtained. In a case of performing coordinated, the calculation amount thereof is "2N". Accordingly, a calculation amount of PF metrics in a case of the cluster size of "2" in "existence of coordination" is "4N".

FIG. 16C to FIG. 16G each illustrate an example of a calculation amount of PF metrics in a case of "existence of coordination" in a cluster size of "3". A calculation amount of PF metrics in this case is "12N". In this case, since performing redundant calculation, cells indicated by dotted lines are not counted as calculation amounts.

While a calculation method in a case of "existence of coordination" in a cluster size of "4" is not illustrated, a calculation amount becomes "32N" if being calculated in the same way as in the cluster size of "2" or the cluster size of "3". FIG. 9 illustrates a calculation amount in a case of "existence of coordination" in a cluster size of "5" or more. As illustrated in FIG. 9, a case of "existence of coordination" illustrates an example in which a calculation amount of PF metrics significantly increases with an increase in a cluster size.

On the other hand, "existence of coordination (second example)" in FIG. 9 indicates a calculation amount in the present second embodiment. A calculation amount of PF metrics in a case of "existence of coordination (the second example)" in the cluster size of, for example, "2" is "2N". The reason is as follows.

In other words, as illustrated in FIG. 5, the centralized control station 100 performs the calculation processing (S12) for an implementation ratio. The calculation of an implementation ratio is processing for calculating for every fluctuation of a user distribution, such as, for example, a case of receiving the RSRP (S10 or S11). The calculation of an implementation ratio is not processing performed in, for example, every subframe time period but is calculated in a time period longer than the subframe time period. Accordingly, the calculation of an implementation ratio is not counted as a calculation amount of PF metrics.

On the other hand, as illustrated in FIG. 5, the selection processing for a coordination pattern (S13 or S21) is performed in every subframe time period. However, since being simple processing, the selection processing for a coordination pattern is not counted as a calculation amount. The reason is as follows.

In other words, in the coordination pattern selection processing (S13 or S21), the implementation ratios $O_m$ and $O_{m,l}$ are used, without change, for Expression (13) used for calculating the PF metrics $M_m$ and $M_{m,l}$, and Expression (13) is independent from the user n. Accordingly, the selection processing for a coordination pattern is not counted as a calculation amount of PF metrics.

Therefore, in the present second embodiment, as for a calculation amount of PF metrics, a calculation amount of PF metrics in the user selection processing (S17, S19, or S24) performed in every subframe only has to be counted.

At the time of the user selection processing, the base station 200-1 selects a maximum user UE by using, for example, Expression (15) (S17), and the calculation amount thereof becomes "N" serving as the number of all users belonging to the base station 200-1. As for the base station 200-2, a calculation amount of PF metrics becomes "N" in the same way. Accordingly, a calculation amount in the time period of a "subframe #1" becomes "2N".

If the same applies hereinafter and calculating is performed for a case of "existence of coordination (the second example)", a calculation amount becomes "3N" for the cluster size of "3", and a calculation amount becomes "4N" for the cluster size of "4".

Accordingly, in the present second embodiment, as illustrated in FIG. 9, a calculation amount in a case of the cluster size of "2" becomes "2N". If calculating for the cluster sizes of "3" and "4" is performed in the same way, calculation amounts become "3N" and "4N", respectively.

In this way, in the present second embodiment, the centralized control station 100 preliminarily calculates implementation ratios and uses the uniform implementation ratios over time periods (for example, subframe time periods), thereby selecting, based on the relevant implementation ratios, a coordination pattern.

From this, compared with a case where the PF metrics of all users are calculated with respect to, for example, all coordination patterns in every scheduling time period (for example, "existence of coordination" in FIG. 9), it is possible to achieve suppression of a calculation amount, in the present second embodiment (for example, "existence of coordination (the second example)" in FIG. 9).

2. Another Example of Operation

Next, another example of an operation in the present second embodiment will be described. At the time of the above-mentioned selection of a coordination pattern (S13), an example in which, as illustrated in FIG. 8, the centralized control station 100 selects a coordination pattern in order staring from the cell number 1 is described. The centralized control station 100 may calculate PF metrics regarding, for example, all coordination patterns and may select a coordination pattern whose PF metric is maximized.

Figure 10:
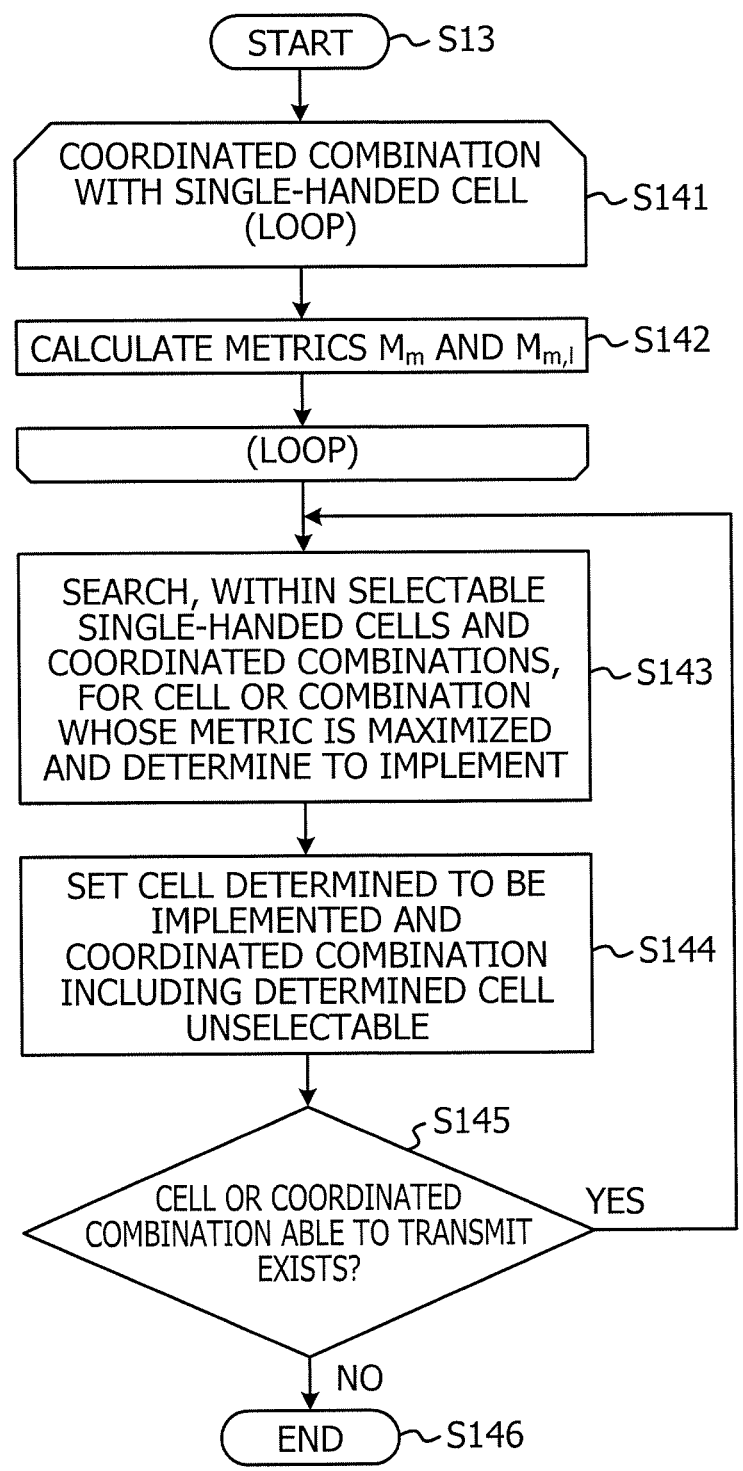
FIG. 10 is a flowchart illustrating an example of an operation of the coordination pattern selection processing.

FIG. 10 is a flowchart illustrating an example of an operation of the coordination pattern selection processing in such a case. In this case, processing utilizing mathematical expressions in individual processing operations is performed in some cases. Such mathematical expressions are stored in, for example, an internal memory or the like of the coordination pattern selection unit 120, and the coordination pattern selection unit 120 may arbitrarily read the mathematical expressions, may perform, for example, processing for substituting values into the mathematical expressions, and may store processing results thereof in the internal memory, thereby performing the processing.

Upon starting the processing (S13), the coordination pattern selection unit 120 calculates the PF metrics $M_m$ and $M_{m,l}$ of implementation ratios (S141 and S142). Using, for example, Expression (13), the coordination pattern selection unit 120 calculates the PF metrics $M_m$ and $M_{m,l}$ of implementation ratios.

Next, the coordination pattern selection unit 120 searches within the calculated PF metrics for a coordination pattern serving as a maximum metric and determines to implement the searched coordination pattern (S143). The PF metrics $M_m$ and $M_{m,l}$ of implementation ratios are values for, for example, every base station 200. The coordination pattern selection unit 120 calculates a PF metric for every coordination pattern by, for example, adding the PF metrics $M_m$ and $M_{m,l}$ of implementation ratios and selects a coordination pattern whose PF metric is maximized.

Next, the coordination pattern selection unit 120 sets the corresponding base station 200, included in the coordination pattern determined to be implemented, unselectable (S144) and repeats the processing until no other selectable base station remains (S145: YES). The coordination pattern selection unit 120 may store, for example, flag information in the internal memory, thereby setting the relevant base station 200 unselectable.

If no base station 200 selectable as a coordination pattern remains (S145: NO), the coordination pattern selection unit 120 terminates the coordination pattern selection processing (S146) and notifies each of the base stations 200 of information regarding a selected coordination pattern (S15, S16, S22, or S23 in FIG. 5).

In addition, as another example of an operation in the present second embodiment, there is, for example, the following example of an operation. In other words, as for the above-mentioned selection of a coordination pattern (S13), the coordination pattern selection unit 120 may select a coordination pattern by using the implementation ratios $O_m$ and $O_{m,l}$ without calculating the PF metrics $M_m$ and $M_{m,l}$ of the implementation ratios. Hereinafter, a specific example will be described.

Figure 11A:
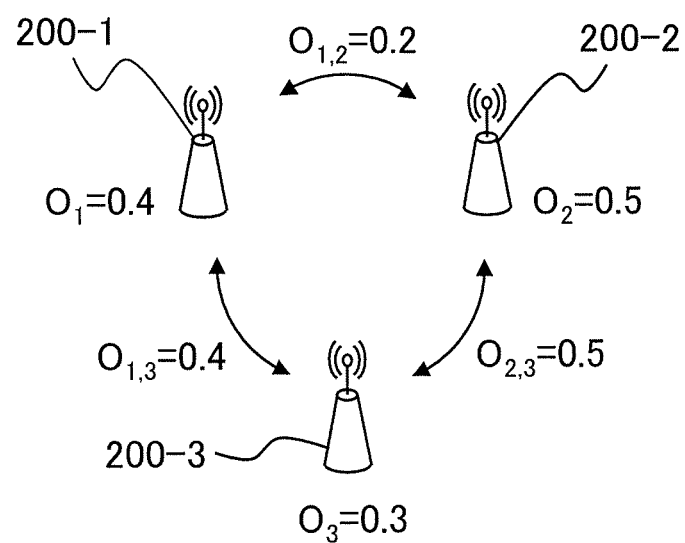
FIG. 11A is a diagram illustrating examples of implementation ratios.

FIG. 11A illustrates examples of the implementation ratios $O_m$ and $O_{m,l}$. In addition, FIG. 11B to FIG. 11E each illustrate an example of a coordination pattern, and FIG. 11F illustrates examples of implementation ratios of respective coordination patterns (or wireless resource allocation rates). Using these drawings, how to select a coordination pattern will be described.

If implementation ratios of the "Pattern #1", the "Pattern #2", a "Pattern #3", and a "Pattern #4" are $C_1$, $C_2$, $C_3$, and $C_4$, respectively, implementation ratios of coordination patterns (or allocation rates of wireless resources) are as follows.

$$O_1 = C_1 + C_3 \quad (19)$$

$$O_2 = C_1 + C_4 \quad (20)$$

$$O_3 = C_1 + C_2 \quad (21)$$

$$O_{1,2} = C_2 \quad (22)$$

$$O_{2,3} = C_3 \quad (23)$$

$$O_{1,3} = C_4 \quad (24)$$

By solving a simultaneous equation of Expression (19) to Expression (24), the coordination pattern selection unit 120 obtains $C_1=0.1$, $C_2=0.2$, $C_3=0.3$, and $C_4=0.4$. In other words, by setting wireless resources to implement respective coordination patterns to ratios of "10%", "20%", "30%", and "40%", respectively, within one subframe, the coordination pattern selection unit 120 selects the coordination patterns.

Since, in the present example of an operation, the PF metrics $M_m$ and $M_{m,l}$ are not calculated, a calculation amount is reduced compared with a case of calculating the PF metrics $M_m$ and $M_{m,l}$, and it is possible to achieve further suppression of a calculation amount.

Third Embodiment

Next, a third embodiment will be described. The third embodiment is an example further including a beam pattern (or a transmission pattern, and hereinafter called a "transmission pattern" in some cases).

Figure 12:
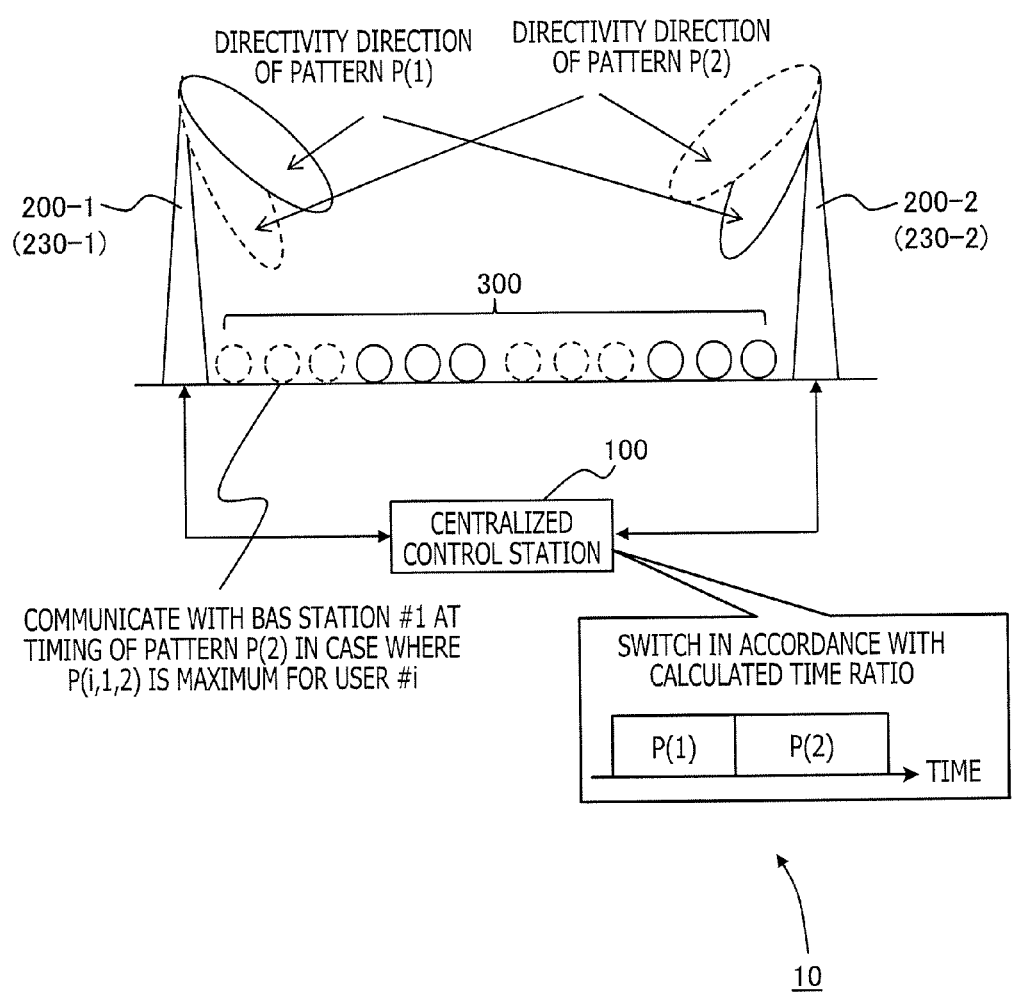
FIG. 12 is a diagram illustrating an example of a transmission pattern.

FIG. 12 is a diagram illustrating an example of a transmission pattern. As illustrated in FIG. 12, the base stations 200-1 and 200-2 include antennas 230-1 and 230-2, respectively, which have directivities.

The centralized control station 100 is able to control so as to temporally alternately switch between a transmission pattern P(1) in which a tilt angle is shallower than a predetermined angle in the base station 200-1 and a tilt angle is deeper than a predetermined angle in the base station 200-2 and a transmission pattern P(2) set in the opposite way.

In other words, the centralized control station 100 transmits, to the base stations 200-1 and 200-2, control signals that instruct to switch transmission patterns. On the other hand, in accordance with the relevant control signals, the base stations 200-1 and 200-2 switch the tilt angles of the antennas 230-1 and 230-2, respectively. Based on such switching, it is possible to temporally alternately switch between the transmission pattern P(1) and the transmission pattern P(2).

In the wireless communication system 10 of the present third embodiment, one transmission pattern of, for example, the two transmission patterns P(1) and P(2) is selected, and a coordination pattern utilizing the selected transmission pattern is selected.

Note that the term "transmission pattern" indicates each of different directions when, for example, the antennas 230-1 and 230-2 transmit respective wireless signals in the different directions.

Figure 13:
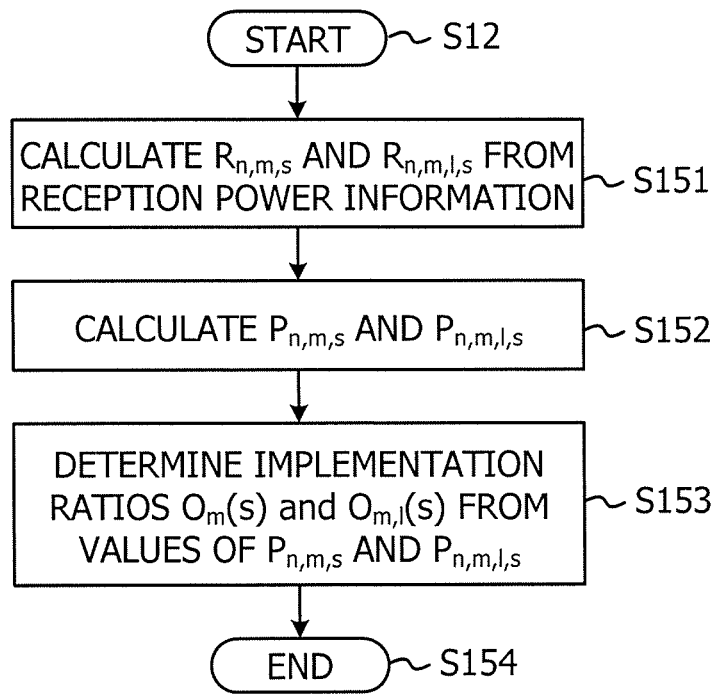
FIG. 13 is a flowchart illustrating an example of an operation of calculation processing for an implementation ratio.
Figure 14:
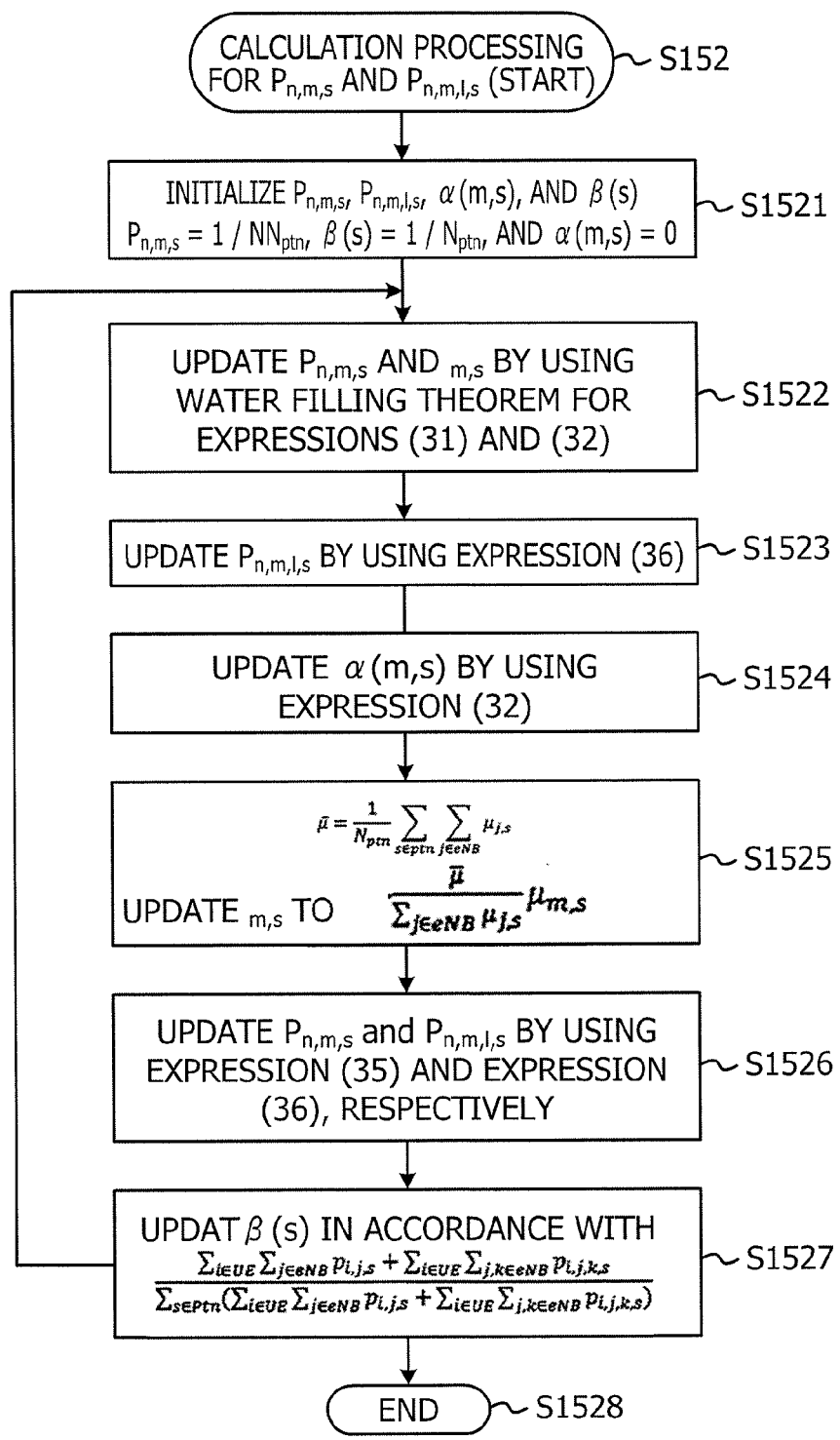
FIG. 14 is a flowchart illustrating an example of an operation of the ratio calculation processing.

FIG. 13 and FIG. 14 are flowcharts each illustrating an example of an operation of calculation processing for an implementation ratio (S12 in FIG. 5) in the present third embodiment. Note that, in each of operations illustrated in FIG. 13 and FIG. 14, processing utilizing mathematical expressions is performed in some cases. Such mathematical expressions are stored in, for example, an internal memory or the like of the ratio calculation unit 110, and the ratio calculation unit 110 may arbitrarily read the mathematical expressions from the internal memory at the time of the processing, may perform, for example, processing for substituting values into the mathematical expressions, and may store processing results thereof in the internal memory, thereby performing the processing.

In the present third embodiment, in the same way as in the second embodiment, the centralized control station 100 receives the RSRP information from each of the base stations 200-1 and 200-2 (S10 or S11 in FIG. 5) and performs calculation processing for an implementation ratio (S12).

As illustrated in FIG. 13, upon starting the processing (S12), the ratio calculation unit 110 calculates, from the RSRP information, expected throughputs $R_{n,m,s}$ and $R_{n,m,l,s}$. The ratio calculation unit 110 calculates using the following mathematical expressions.

$$SINR_{n,m,s} = \frac{P_{n,m,s}}{N_{th} + \sum_{j \neq m} P_{n,j,s}} \quad (25)$$

$$R_{n,m,s} = W\log\left(1 + \frac{SINR_{n,m,s}}{\alpha}\right) \quad (26)$$

$$SINR_{n,m,l,s} = \frac{P_{n,m,s} + P_{n,l,s}}{N_{th} + \sum_{j \neq m,l} P_{n,j,s}} \quad (27)$$

$$R_{n,m,l,s} = W\log\left(1 + \frac{SINR_{n,m,l,s}}{\alpha}\right) \quad (28)$$

$$SINR_{n,m,l,s} = \frac{P_{n,m,s} + 2\sqrt{P_{n,m,s}P_{n,l,s}} + P_{n,l,s}}{N_{th} + \sum_{j \neq m,l} P_{n,j,s}} \quad (29)$$

Here, $SINR_{n,m,s}$ and $R_{n,m,s}$ indicate SINR and an expected throughput, respectively, in a case where the user n performs wireless communication by using a transmission pattern s without performing coordinated communication with, for example, the m-th base station 200. In addition, $SINR_{n,m,s,l}$ and $R_{n,m,l,s}$ indicate SINR and an expected throughput, respectively, in a case where the user n performs wireless communication by using the transmission pattern s, based on coordinated communication between, for example, the m-th and l-th base stations 200. Furthermore, $P_{n,m,s}$ individually indicates a reception power reported value (for example, the RSRP information) in a case where the m-th base station 200, reported by the user n, performs wireless communication by using the transmission pattern s.

Expression (25) and Expression (26) are calculation formulas for the expected throughput $R_{n,m,s}$ in a case of not performing coordinated communication, and Expression (27) and Expression (28) are calculation formulas for the expected throughput $R_{n,m,l,s}$ in a case of performing coordinated communication. In addition, Expression (29) is SINR in a case of performing coherent transmission between coordinated cells so as to achieve phase matching in the mobile station 300, and by substituting a result of Expression (29) into Expression (28), the expected throughput $R_{n,m,l,s}$ in such a case is obtained. Expression (29) corresponds to Expression (5) in the second embodiment.

Next, the ratio calculation unit 110 calculates two ratios $P_{n,m,s}$ and $P_{n,m,l,s}$ (S152). The ratio $P_{n,m,s}$ indicates, for example, a ratio by which the user n performs wireless communication with the m-th base station 200 by using the transmission pattern s without performing coordinated communication. The ratio $P_{n,m,s}$ may be, for example, an allocation rate of wireless resources allocated by the m-th base station 200 in a case where the user n performs wireless communication from the m-th base station 200 by using the transmission pattern s without performing coordinated communication.

In addition, the ratio $P_{n,m,l,s}$ indicates, for example, a ratio by which the user n performs, based on coordinated communication, wireless communication with the m-th and l-th base stations 200 by using the transmission pattern s. The ratio $P_{n,m,l,s}$ may be, for example, an allocation rate of wireless resources allocated to the user n by the m-th and l-th base stations 200 in a case where the m-th and l-th base stations 200 performs coordinated communication by using the transmission pattern s.

In the present third embodiment, the ratio calculation unit 110 solves a maximization problem of PF utility, expressed by the following mathematical expressions, thereby calculating the ratios $P_{n,m,s}$ and $P_{n,m,l,s}$.

maximize (30)
$$U = \frac{1}{N} \sum_{n \in UE} \log \left\{ \sum_{s \in P_{tn}} \left( \sum_{m \in eNB(n)} R_{n,m,s} p_{n,m,s} + \sum_{\substack{m,l \in eNB(n) \\ m \neq l}} R_{n,m,l,s} p_{n,m,l,s} \right) \right\}$$

subject to $$\sum_{n \in UE(m)} p_{n,m,s} = \beta(s)\{1 - \alpha(m, s)\} \quad (31)$$

$$\sum_{\substack{n \in UE(m,l) \\ l \in eNB(n)}} p_{n,m,l,s} = \beta(s)\alpha(m, s) \quad (32)$$

$$\sum_{s \in P_{tn}} \beta(s) = 1 \quad (33)$$

$$p_{n,m,s} \geq 0, \quad (34)$$
$$p_{n,m,l,s} \geq 0$$

$$p_{n,m,s} = \max\left(0, \frac{1}{\mu_{m,s}} - \frac{T'_{n,m,s}}{R_{n,m,s}}\right) \quad (35)$$

$$T'_{n,m,s} = \sum_{t \in P_{tn}} \left( \sum_{j \in eNB(n)} R_{n,j,t} p_{n,j,t} + \sum_{j,k \in eNB(n)} R_{n,j,k,t} p_{n,j,k,t} \right) - R_{n,m,s} p_{n,m,s}$$

$$p_{n,m,l,s} = \max\left(0, \frac{1}{\mu_{m,s} + \mu_{l,s}} - \frac{T'_{n,m,l,s}}{R_{n,m,l,s}}\right) \quad (36)$$

$$T'_{n,m,l,s} = \sum_{t \in P_{tn}} \left( \sum_{j \in eNB(n)} R_{n,j,t} p_{n,j,t} + \sum_{j,k \in eNB(n)} R_{n,j,k,t} p_{n,j,k,t} \right) - R_{n,m,l,s} p_{n,m,l,s}$$

$m, l \in eNB(n),$
$s \in P_{tn}$ $$\mu = \sum_{m \in eNB} \mu_{m,l} \quad (37)$$

In Expression (30) to Expression (37), "eNB" indicates a whole set of the base stations 200, "UE" indicates a whole set of users, "eNB(n)" indicates a set of transmission cell candidates of the user n, and "UE(m)" indicates a whole set of UEs including the m-th base station 200 as a transmission cell candidate. In addition, "UE(m,l)" indicates a whole set of UEs including the m-th and l-th base stations 200 as transmission cell candidates, and "s" indicates the number of a transmission pattern corresponding to the transmission pattern P(1) or P(2). Furthermore, "α(m,s)" indicates a ratio (or an allocation rate of wireless resources) by which the m-th base station 200 performs coordinated communication in a case where the transmission pattern is "s", and β(s) indicates a ratio (or an allocation rate of wireless resources) by which the transmission patterns of all the base stations 200 are "s".

Note that the set eNB(n) of transmission cell candidates of the user n may be defined as all base stations that are each capable of measuring reception power and that are included in the base stations 200 likely to perform communication with the user n. Alternatively, as the set eNB(n), a predetermined number of the base stations 200, determined in descending order of reception power, may be selected.

The calculation of the two ratios $P_{n,m,s}$ and $P_{n,m,l,s}$ is performed in accordance with, for example, the flowchart illustrated in FIG. 14. In other words, upon starting the calculation processing (S152), the ratio calculation unit 110 initializes the four ratios $P_{n,m,s}$, $P_{n,m,l,s}$, α(m,s), and β(s) (S1521). The ratio calculation unit 110 performs initialization, for example, as follows.

$$P_{n,m,s} = \frac{1}{NN_{ptn}},$$

$$P_{n,m,s,l} = 0,$$

-continued $$\beta(s) = \frac{1}{N_{ptn}},$$

$$\alpha(m, s) = 0$$

Note that "$N_{ptn}$" indicates the total number of transmission patterns.

Next, using a water filling theorem for Expression (31) and Expression (35), the ratio calculation unit 110 updates the ratio $P_{n,m,s}$, by which the user n performs wireless communication by using the transmission pattern s without performing coordinated communication, and a variable $\mu_{m,s}$ (S1522).

Next, using Expression (36), the ratio calculation unit 110 updates the ratio $P_{n,m,l,s}$ by which the user n performs coordinated communication by using the transmission pattern s (S1524).

Next, using Expression (32), the ratio calculation unit 110 updates the ratio $\alpha(m,s)$ (S1524).

Next, the ratio calculation unit 110 updates the variable (S1525). The ratio calculation unit 110 updates the variable $\mu_{m,s}$ by using the following Expression.

$$\frac{\bar{\mu}}{\sum_{j \in eNB} \mu_{j,s}} \quad (38)$$

In this regard, however, the following Expression is satisfied.

$$\bar{\mu} = \frac{1}{N_{ptn}} \sum_{s \in ptn} \sum_{j \in eNB} \mu_{j,s}$$

Next, the ratio calculation unit 110 updates the two ratios $P_{n,m,s}$ and $P_{n,m,l,s}$, by using Expression (35) and Expression (36), respectively (S1526). Using, for example, the variable $\mu_{m,s}$ calculated in S1525, the ratio calculation unit 110 updates the two ratios $P_{n,m,s}$ and $P_{n,m,l,s}$.

Next, the ratio calculation unit 110 updates the ratio $\beta(s)$ by which a transmission pattern is s (S1527). The ratio calculation unit 110 updates the ratio $\beta(s)$ by using the following Expression.

$$\frac{\sum_{i \in UE} \sum_{j \in eNB} P_{i,j,s} + \sum_{i \in UE} \sum_{j,k \in eNB} P_{i,j,k,s}}{\sum_{s \in ptn} \left( \sum_{i \in UE} \sum_{j \in eNB} P_{i,j,s} + \sum_{i \in UE} \sum_{j,k \in eNB} P_{i,j,k,s} \right)} \quad (39)$$

Then, the ratio calculation unit 110 terminates the calculation processing (S1528).

Based on the above-mentioned processing, the wireless resource allocation rate $\beta(s)$ for, for example, the transmission pattern s is calculated. In addition, it becomes possible to calculate the allocation rate $\alpha(m,s)$ of wireless resources in a case of performing, in each of the base stations 200, coordinated communication by using the transmission pattern s. Furthermore, it becomes possible to calculate an allocation rate $(1-\alpha(m,s))$ of wireless resources in a case of performing, in each of the base stations 200, wireless communication without performing coordinated communication by using the transmission pattern s.

Returning to FIG. 13, next the ratio calculation unit 110 calculates the implementation ratios $O_m(s)$ and $O_{m,l}(s)$, based on the ratios $P_{n,m,s}$ and P respectively (S153). The ratio calculation unit 110 calculates the implementation ratios $O_m(s)$ and $O_{m,l}(s)$ by using, for example, the following Expression.

$$O_m(s) = \sum_{n \in UE(m)} p_{n,m,s}, \quad (40)$$

$$O_{m,l}(s) = \sum_{\substack{n \in UE(m,l) \\ l \in eNB(n)}} p_{n,m,l,s}$$

In Expression (40), "$O_m(s)$" indicates, for example, a ratio (or an allocation rate of wireless resources) by which wireless communication is performed in the m-th base station 200 by using the transmission pattern s without performing coordinated communication. In addition, "$O_{m,l}(s)$" indicates, for example, a ratio (or an allocation rate of wireless resources) by which coordinated communication is performed in the m-th and l-th base stations 200 by using the transmission pattern s.

Then, the ratio calculation unit 110 terminates the calculation processing for implementation ratios (S12 in FIG. 5) (S154). The ratio calculation unit 110 outputs the calculated two implementation ratios $O_m(s)$ and $O_{m,l}(s)$ to the coordination pattern selection unit 120.

Figure 15:
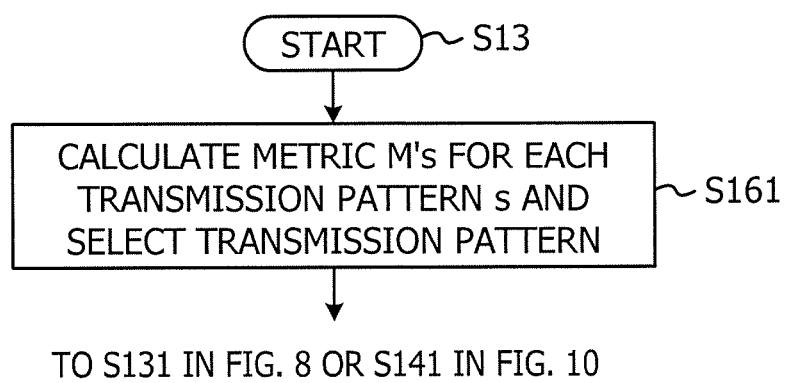
FIG. 15 is a flowchart illustrating an example of an operation of the coordination pattern selection processing.

Next, the coordination pattern selection unit 120 performs the coordination pattern selection processing (S13 in FIG. 5). FIG. 15 is a flowchart illustrating an example of an operation of the coordination pattern selection processing. In the same way as in the second embodiment, the coordination pattern selection unit 120 performs the coordination pattern selection processing in, for example, every scheduling period (for example, a subframe time period).

Upon starting the processing (S13), the coordination pattern selection unit 120 calculates a PF metric $M'_s$ for each of transmission patterns and selects the transmission pattern s (S161). The coordination pattern selection unit 120 calculates the PF metric $M'_s$ in accordance with, for example, the following Expression (41).

$$M'_s = \frac{\beta(s)}{\tilde{\beta}(s)} \quad (41)$$

The coordination pattern selection unit 120 selects (or determines), as a transmission pattern in the corresponding base station 200, for example, the transmission pattern s having a maximum PF metric from among the calculated $M'_s$s. Using a variable $A^m(s)$, whose value is "1" in a case where the transmission pattern s is selected and whose value is "0" if this is not the case, and a forgetting factor $\beta'$, the coordination pattern selection unit 120 updates an average allocation rate $$\tilde{\beta}(s)$$

in accordance with the following Expression (42).

$$\tilde{\beta}(s)^{n+1} = (1-\beta')\tilde{\beta}(s)^n + \beta' A^n(s) \quad (42)$$

Subsequent processing is the same as in the second embodiment. In this regard, however, regarding the calculation of the PF metric of an implementation ratio, Expression (13) and Expression (14) in the second embodiment are replaced with Expression (43) and Expression (44), respectively. In addition, Expression (18) is replaced with the following Expression (45).

$$M_m(s) = \frac{O_m(s)}{\tilde{O}_m(s)}, \quad (43)$$

$$M_{m,l}(s) = \frac{O_{m,l}(s)}{\tilde{O}_{m,l}(s)}$$

$$\tilde{O}_{m,l}^{n+1}(s) = (1-\beta)\tilde{O}_{m,l}^{n}(s) + \beta A^n \quad (44)$$

$$UE = \max_{j \in UE(m,l,s)} \frac{R_j}{\tilde{R}_j} \quad (45)$$

Note that, in Expression (45), "UE(m,l,s)" indicates a set of UEs that perform communication, based on coordinated communication between the m-th and l-th base stations 200, in the transmission pattern s. In addition, Expression (17) may be used as an average throughput in Expression (45).

In the present third embodiment, in the wireless communication system 10, implementation ratios are calculated in the centralized control station 100. In addition, in the wireless communication system 10, the calculated implementation ratios are used over periods (for example, subframe time periods), and coordination patterns are selected based on the uniform implementation ratios in each of the periods.

Accordingly, in the third embodiment, in the same way as in the second embodiment, it is possible to achieve suppression of a calculation amount, compared with a case where PF metrics of all users are calculated with respect to all coordination patterns in each of the periods (for example, "existence of coordination" in FIG. 9).

Note that, in the present third embodiment, as illustrated in, for example, FIG. 10, the ratio calculation unit 110 may calculate PF metrics regarding implementation ratios for all coordination patterns and may select a coordination pattern whose PF metric is maximized.

In addition, in the present third embodiment, as illustrated in, for example, FIG. 11A to FIG. 11F, the coordination pattern selection unit 120 may select a coordination pattern by using the implementation ratios $O_m$ and $O_{m,l}$ without calculating the PF metrics $M_m$ and $M_{m,l}$ of the implementation ratios.

Another Embodiment

Figure 17:
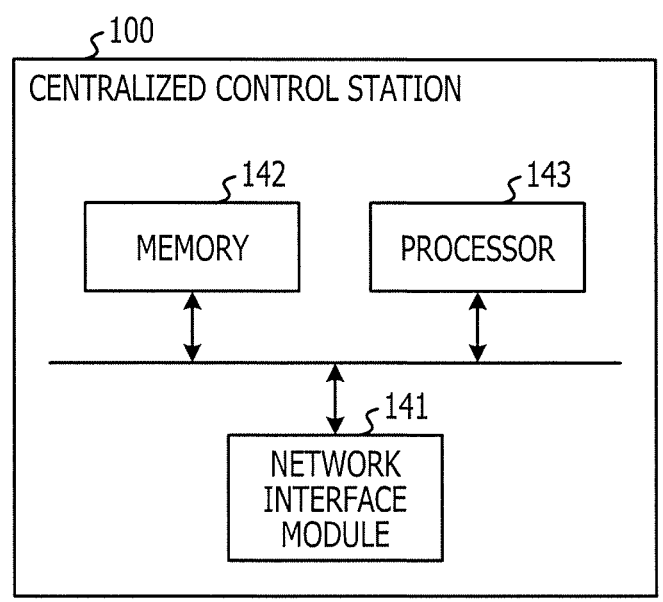
FIG. 17 is a diagram illustrating an example of a hardware configuration of a centralized control station.

FIG. 17 is a diagram illustrating an example of a hardware configuration of the centralized control station 100. The centralized control station 100 includes a network interface module 141, a memory 142, and a processor 143.

By reading a program stored in the memory 142 and executing the relevant program, the processor 143 is able to perform functions of the ratio calculation unit 110 and the coordination pattern selection unit 120. The processor 143 corresponds to, for example, the ratio calculation unit 110 and the coordination pattern selection unit 120 in the second embodiment.

The network interface module 141 is an interface module used by the centralized control station 100 to perform communication with, for example, the base stations 200.

Note that the memory 142 corresponds to, for example, the internal memories of the ratio calculation unit 110 and the coordination pattern selection unit 120 in the second embodiment.

Figure 18:
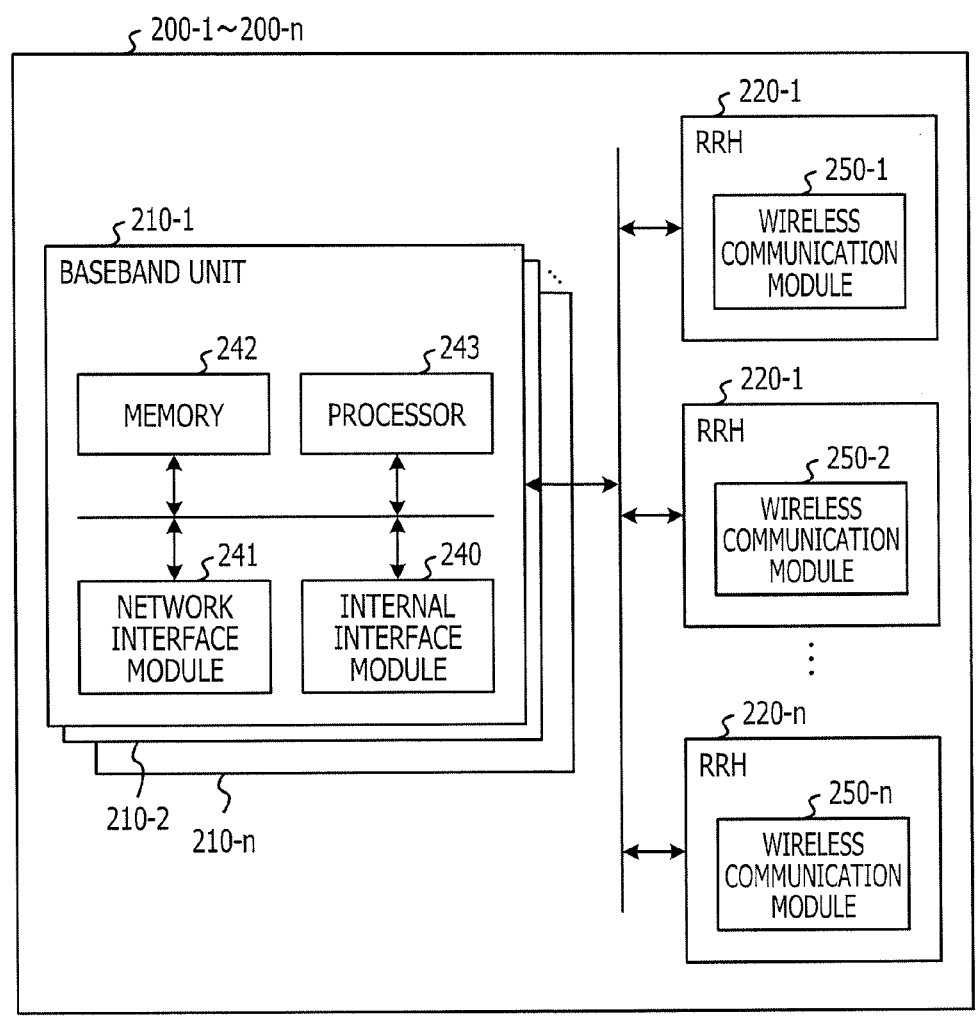
FIG. 18 is a diagram illustrating an example of a hardware configuration of a base station.

FIG. 18 is a diagram illustrating examples of hardware configurations of the base stations 200-1 to 200-n. A baseband unit 210-1 includes an internal interface module 240, a network interface module 241, a memory 242, and a processor 243.

By reading a program stored in the memory 242 and executing the relevant program, the processor 243 performs functions of the data generation unit 201, the error correction coding unit 202, the modulation unit 203, the channel multiplexing unit 208, the IFFT unit 209, and the CP addition unit 211. In addition, by executing the relevant program, the processor 243 performs functions of the cell common RS generation unit 204, the mobile station unique RS generation unit 205, the CSI-RS generation unit 206, the Downlink control signal generation unit 207, the Uplink reception unit 212, and the scheduler 215.

The processor 243 corresponds to, for example, the data generation unit 201, the error correction coding unit 202, the modulation unit 203, the channel multiplexing unit 208, the IFFT unit 209, and the CP addition unit 211. In addition, the processor 243 corresponds to the cell common RS generation unit 204, the mobile station unique RS generation unit 205, the CSI-RS generation unit 206, the Downlink control signal generation unit 207, the Uplink reception unit 212, and the scheduler 215.

The internal interface module 240 is an interface module for performing communication with the RRH units 220-1 to 220-n connected via, for example, optical cables. As interfaces handled in the internal interface module 240, there are, for example, a common public radio interface (CPRI) and so forth.

In addition, the network interface module 241 is an interface module used by each of the base stations 200-1 to 200-n to perform communication with, for example, the centralized control station 100.

The RRH unit 220-1 includes a wireless communication module 250-1. The wireless communication module 250-1 corresponds to, for example, the Downlink wireless processing unit 221-1, the Uplink wireless processing unit 222-1, and the antennas 230-11 and 230-12 in the second embodiment.

In addition, the memory 242 corresponds to, for example, the internal memory of the scheduler 215 in the second embodiment.

Note that the RRH units 220-2 to 220-n each have the same configuration as that of the RRH unit 220-1.

Figure 19:
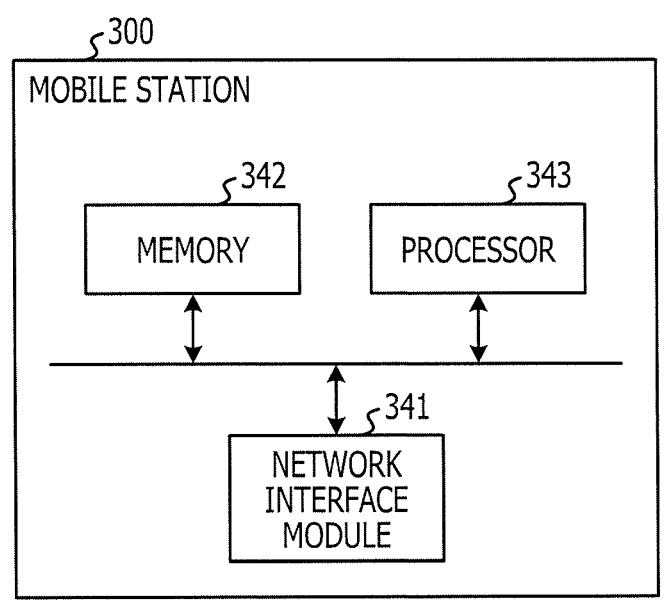
FIG. 19 is a diagram illustrating an example of a hardware configuration of a mobile station.

FIG. 19 is a diagram illustrating a hardware configuration of the mobile station 300. The mobile station 300 includes a wireless communication module 341, a memory 342, and a processor 343.

By reading a program stored in the memory 342 and executing the relevant program, the processor 343 performs functions of the CP removal unit 303, the FFT unit 304, the channel demapping unit 305, and the Downlink control signal demodulation decoding unit 306 in the second embodiment. In addition, by executing the relevant program, the processor 343 performs functions of the channel estimation unit 307, the CSI estimation unit 308, the demodulation unit 309, the error correction decoding unit 310, the Ack-Nack generation unit 311, and the Uplink transmission unit 312.

The processor 343 corresponds to, for example, the CP removal unit 303, the FFT unit 304, the channel demapping unit 305, and the Downlink control signal demodulation decoding unit 306 in the second embodiment. In addition, the processor 343 corresponds to, for example, the channel estimation unit 307, the CSI estimation unit 308, the demodulation unit 309, the error correction decoding unit 310, the Ack-Nack generation unit 311, and the Uplink transmission unit 312 in the second embodiment.

The wireless communication module 341 corresponds to, for example, the antennas 301 and 314, the Downlink wireless processing unit 302, and the Uplink wireless processing unit 313 in the second embodiment.

Each of the processors 143, 243, and 343 may be, for example, a central processing unit (CPU), a field-programmable gate array (FPGA), a digital processing unit (DSP), or a controller.

In addition, the above-mentioned second and third embodiments are described under the assumption that the centralized control station 100 is located outside the base stations 200. The centralized control station 100 may be provided inside the base stations 200. In this case, the ratio calculation unit 110 and the coordination pattern selection unit 120 in the centralized control station 100 may be provided inside, for example, the baseband units 210-1 to 210-n. In this case, the base stations 200 are control devices, and the whole of, for example, FIG. 3 corresponds to the base stations 200 or the control device 100.

Furthermore, the above-mentioned second and third embodiments are described using the quality information in a downlink communication direction as example of the quality information. The quality information may be, for example, quality information in an uplink communication direction. In this case, each of the base station 200 estimates quality, based on a reference signal transmitted by the corresponding terminal 300, and transmits the estimated quality information to the control device 100. Based on this quality information, the control device 100 only has to perform processing such as selection of a coordination pattern.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device in a wireless communication system, the control device comprising:
a memory; and
a processor coupled to the memory and configured to:
receive, from a first base station, first quality information indicating a quality of a wireless signal transmitted from the first base station,
receive, from a second base station, second quality information indicating a quality of a wireless signal transmitted from the second base station,
determine a first ratio and a second ratio based on the first quality information and the second quality information,
the first ratio being a signal quality ratio of a coordinated transmission, the coordinated transmission performed by the first base station and the second base station,
the second ratio being a signal quality ratio of an uncoordinated transmission, the uncoordinated transmission performed by the first base station without the second base station, and
determine a coordination pattern based on the first ratio and the second ratio,
the coordination pattern indicating a first wireless resource and a second wireless resource in a specified wireless resource,
the first wireless resource being a wireless resource allocated to the coordinated transmission performed by the first base station and the second base station,
the second wireless resource being a wireless resource allocated to the uncoordinated transmission by the first base station,
wherein the determining of the coordination pattern comprises determining:
a ratio of the first wireless resource to the specified wireless resource corresponding to the first ratio, and
a ratio of the second wireless resource to the specified wireless resource corresponding to the second ratio,
applying the coordinated pattern a specified period including a plurality of units of period, each of the plurality of units of period being a unit of period for wireless transmission in the wireless communication system.

2. The control device according to claim 1,
wherein the first ratio is a ratio with which the first base station and the second base station coordinately transmit a wireless signal to a first terminal, and
the second ratio is a ratio with which the first base station transmits a wireless signal to a second terminal without coordinating with the second base station.

3. The control device according to claim 1,
wherein the first ratio is a ratio of a wireless resource allocated to a wireless communication in which the first base station and the second base station coordinately transmit a wireless signal to a first terminal, and
the second ratio is a ratio of a wireless resource allocated to a wireless communication in which the first base station transmits a wireless signal to a second terminal without coordinating with the second base station.

4. The control device according to claim 1,
wherein the first ratio is a ratio with which the first base station and the second base station coordinately transmit wireless signals to all of first terminals that are located in an overlapping area of
a first cell formed by the first base station and
a second cell formed by the second base station, and
the second ratio is a ratio with which the first base station transmits wireless signals to all of second terminals that are located in the first cell, without coordinating with the second base station.

5. The control device according to claim 1,
wherein the first ratio is a ratio of wireless resources allocated to wireless communications in which the first base station and the second base station coordinately transmit wireless signals to all of first terminals that are located in an overlapping area of
a first cell formed by the first base station and
a second cell formed by the second base station, and
the second ratio is a ratio of wireless resources allocated to wireless communications in which the first base station transmits wireless signals to all of second terminals that are located in the first cell, without coordinating with the second base station.

6. The control device according to claim 1,
wherein at least one of the first ratio and the second ratio is determined for a period that is longer than an unit of period for wireless transmission in the wireless communication system.

7. The control device according to claim 1,
wherein the plurality of units of period for wireless transmission in the is a plurality of subframes.

8. The control device according to claim 1,
wherein at least one of the first ratio and the second ratio is determined based on at least one of a first throughput and a second throughput respectively,
the first throughput being a throughput with which the first base station and the second base station perform the coordinated transmission,
the second throughput being a throughput with which the first base station performs the uncoordinated transmission without the second base station.

9. The control device according to claim 1,
wherein at least one of the first ratio and the second ratio is determined by solving a problem for maximizing proportional fairness (PF) utility based on
the first quality information and the second quality information, respectively.

10. The control device according to claim 1,
wherein the coordination pattern is determined based on at least one of
a third ratio and a fourth ratio,
the third ratio being a ratio of the first ratio to an average of the first ratio,
the fourth ratio being a ratio of the second ratio to an average of the second ratio.

11. The control device according to claim 1,
wherein at least one of the first ratio and the second ratio is determined for each transmission pattern indicating each direction of each wireless signal transmitted from the first base station and the second base station, based on the first quality information and the second quality base station, respectively.

12. The control device according to claim 11,
wherein the processor is further configured to determine a fifth ratio with which each transmission pattern is applied to a wireless communication, and the coordination pattern is determined further based on the fifth ratio.

13. The control device according to claim 12,
wherein the coordination pattern is determined based on
a third ratio,
a fourth ratio,
and a sixth ratio,
the third ratio being a ratio of the first ratio to an average of the first ratio,
the fourth ratio being a ratio of the second ratio to an average of the second ratio,
the sixth ratio being a ratio of the fifth ratio to an average of the fifth ratio.

14. A control method in a wireless communication system, the control method comprising:
receiving, from a first base station, first quality information indicating a quality of a wireless signal transmitted from the first base station;
receiving, from a second base station, second quality information indicating a quality of a wireless signal transmitted from the second base station;
determining at a first ratio and a second ratio based on the first quality information and the second quality information,
the first ratio being a signal quality ratio of a coordinated transmission, the coordinated transmission performed by the first base station and the second base station,
the second ratio being a signal quality ratio of an uncoordinated transmission, the uncoordinated transmission performed by the first base station without the second base station, and
determine a coordination pattern based on the first ratio and the second ratio,
the coordination pattern indicating a first wireless resource and a second wireless resource in a specified wireless resource,
the first wireless resource being a wireless resource allocated to the coordinated transmission performed by the first base station and the second base station,
the second wireless resource being a wireless resource allocated to the uncoordinated transmission by the first base station,
wherein the determining of the coordination pattern comprises determining:
a ratio of the first wireless resource to the specified wireless resource corresponding to the first ratio, and
a ratio of the second wireless resource to the specified wireless resource corresponding to the second ratio,
applying the coordinated pattern a specified period including a plurality of units of period, each of the plurality of units of period being a unit of period for wireless transmission in the wireless communication system.

15. A base station in a wireless communication system, the control device comprising:
a memory; and
a processor coupled to the memory and configured to:
receive, from a terminal, first quality information indicating a quality of a wireless signal transmitted from the base station to the terminal,
receive, from another base station, second quality information indicating a quality of a wireless signal transmitted from the other base station,
determine a first ratio and a second ratio based on the first quality information and the second quality information,
the first ratio being a signal quality ratio of a coordinated transmission, the coordinated transmission performed by the first base station and the second base station,
the second ratio being a signal quality ratio of an uncoordinated transmission, the uncoordinated transmission performed by the first base station without the second base station, and
determine a coordination pattern based on the first ratio and the second ratio,
the coordination pattern indicating a first wireless resource and a second wireless resource in a specified wireless resource,
the first wireless resource being a wireless resource allocated to the coordinated transmission performed by the base station and the other base station,
the second wireless resource being a wireless resource allocated to the uncoordinated transmission by the base station,
wherein the determining of the coordination pattern comprises determining:
a ratio of the first wireless resource to the specified wireless resource corresponding to the first ratio, and
a ratio of the second wireless resource to the specified wireless resource corresponding to the second ratio, applying the coordinated pattern a specified period including a plurality of units of period, each of the plurality of units of period being a unit of period for wireless transmission in the wireless communication system.

\* \* \* \* \*